United States Patent
Nabeshima et al.

(10) Patent No.: US 6,330,083 B1
(45) Date of Patent: Dec. 11, 2001

(54) IMAGE READING DEVICE PERFORMING LIGHT QUANTITY DETECTION AND CORRECTION WITH TIMING CORRESPONDING TO SELECTED COPYING MODE

(75) Inventors: Takayuki Nabeshima; Katsuaki Tajima, both of Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/084,087

(22) Filed: May 26, 1998

(30) Foreign Application Priority Data

May 28, 1997 (JP) .................................................. 9-138635
Aug. 12, 1997 (JP) .................................................. 9-217370

(51) Int. Cl.[7] .................................................. H04N 1/04
(52) U.S. Cl. .................................................. 358/474; 382/274
(58) Field of Search .................................... 358/474, 475, 358/447, 296, 298, 300, 461, 509; 382/274, 282, 284, 302; 347/131, 130, 118

(56) References Cited

U.S. PATENT DOCUMENTS 4,926,253 * 5/1990 Nakashima .............................. 358/75
4,931,882 * 6/1990 Takeda .................................. 358/474
5,513,018 * 4/1996 Nisimura .............................. 358/474
5,717,790 * 2/1998 Kanesaka .............................. 382/274

FOREIGN PATENT DOCUMENTS

| 62-252277 | 11/1987 | (JP) . | |
|---|---|---|---|
| 403253837 | * 11/1991 | (JP) | .................................. 355/35 |
| 4-54759 | 2/1992 | (JP) . | |
| 5-30102 | 5/1993 | (JP) . | |

* cited by examiner

Primary Examiner—Jerome Grant, II
Assistant Examiner—Negussie Worku
(74) Attorney, Agent, or Firm—Burns, Doane, Swecker & Mathis, LLP

(57) ABSTRACT

In an image reading device, a document is read while being illuminated by a fluorescent lamp and then an image signal is output. A light quantity of the fluorescent lamp illuminating the document is detected with a specified timing. Then, a fluctuation in light quantity of the fluorescent lamp is corrected based on the detected light quantity. The above timing of light quantity detection is changed according to a light quantity variation characteristic, a duration of an illuminating time of the fluorescent lamp, the number of document read operations, or a set copying mode.

35 Claims, 33 Drawing Sheets

Fig. 7

ELECTRO-OPTICAL CHARACTERISTICS

| ITEM | SYMBOL | MINIMUM | STANDARD | MAXIMUM | UNIT | REMARKS |
|---|---|---|---|---|---|---|
| SENSITIVITY | R1 | 150 | 200.0 | 250 | V/(lx·s) | IRRADIATION OF LIGHT OF UNIFORM ILLUMINANCE |
| SENSITIVITY NONUNIFORMITY | PRNU | — | 5.0 | 10.0 | % | — |
| SATURATED OUTPUT VOLTAGE | $V_{SAT}$ | 0.6 | 0.8 | — | V | — |
| AVERAGE OF DARK-TIME OUTPUT | $V_{DRK}$ | — | 3.0 | 6.0 | mV | — |
| DARK-TIME OUTPUT NONUNIFORMITY | DSNU | — | 6.0 | 12.0 | mV | — |
| 5-V POWER CONSUMPTION CURRENT | $I_{VDD}$ | — | 5.0 | 10.0 | mA | — |
| TOTAL TRANSFER EFFICIENCY | TTE | 92.0 | 98.0 | — | % | — |

HIGH IMAGE QUALITY MODE

HIGH PRODUCTION MODE

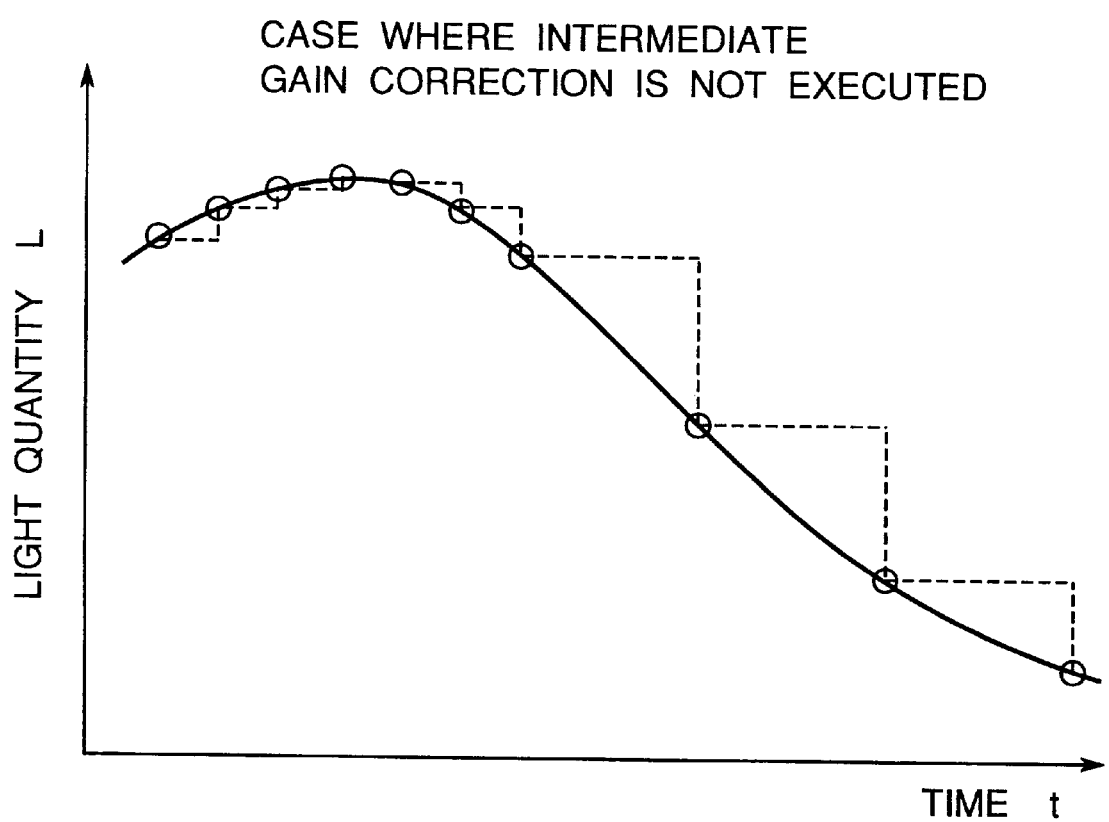

IMAGE READING DEVICE PERFORMING LIGHT QUANTITY DETECTION AND CORRECTION WITH TIMING CORRESPONDING TO SELECTED COPYING MODE

This application is based on applications Nos. 9-138635 and 9-217370 filed in Japan, the contents of which are hereby incorporated by reference.

BACKGROUND OF THE INVENTION

The present invention relates to image reading devices for use in, for example, copying machines and facsimiles, and in particular, to an image reading device which is adapted to continuously read large amounts of documents using a light source such as a fluorescent lamp whose light quantity varies depending on an ambient temperature and other factors.

Conventionally, light quantity correction of a light source for illuminating a document has been executed at a constant frequency, i.e., at constant intervals, even if a copying mode (eg. a high image quality mode and a high production mode) differs.

For example, if the light quantity correcting frequency is adjusted to a high image quality mode, the light quantity correction operation is performed frequently such that the image quality is maintained high. However, such frequent light quantity corrections require comparatively much time. Accordingly, disadvantageously, a productivity in the high production mode is reduced. Conversely, if the light quantity correcting frequency is adjusted to the high production mode, there is a problem that the image quality in the high image quality mode may deteriorate.

Also, there is known a device which absorbs fluctuation in light quantity of a light source by adjusting the light quantity of the light source every time a document page is read (Japanese Patent Publication No. HEI 5-30102).

However, performing a light quantity adjustment so frequently leads to a problem that a warm-up time and a read time for a first copy become long, causing a reduction in productivity.

There is a further concern that the fluctuation in light quantity would be conversely increased by frequently executing the light quantity adjustment. For example, if the light quantity considerably decreases during a continuous read operation and thus the decrease in light quantity is corrected, a light quantity adjustment value, i.e., a lighting control value may considerably increase. Accordingly, upon lighting the light source again after an environmental temperature has decreased after completion of the above continuous read operation, there may be a saturation in light quantity of the light source.

SUMMARY OF THE INVENTION

Accordingly, an object of the present invention is to provide an image reading device and method capable of executing a light quantity correcting operation corresponding to a set mode.

Another object of the present invention is to provide an image reading device and method capable of compensating for a fluctuation in light quantity due to deterioration with time of a light source, without requiring frequent light quantity adjustment operations, thereby allowing the productivity to be compatible with the image quality.

A further object of the present invention is to provide a lighting device and method capable of changing timing of detecting light quantity of a light source illuminating an object such as a document, so that the light quantity of the light source is corrected with a variable timing.

According to an aspect of the present invention, there is provided an image reading device which essentially includes a light source, such as a fluorescent lamp, for illuminating a document, an image reader for reading the illuminated document and outputting an image signal, light quantity detecting means for detecting a light quantity of the light source, light quantity correcting means for correcting a fluctuation in light quantity of the light source based on the light quantity detected by the light quantity detecting means, and light quantity detection timing changing means for changing a timing of light quantity detection by the light quantity detecting means.

In this image reading device, a document is read while being illuminated and then an image signal is output. A quantity of light illuminating the document is detected with a specified timing. Then, a fluctuation in light illuminating the document is corrected based on the detected light quantity. The above timing of light quantity detection is changeable.

In an embodiment, the image reading device includes counting means for counting a number of document read operations performed by the image reader. Then, the timing of light quantity detection is changed according to the number of document read operations counted by the counting means.

In an embodiment, the image reading device includes mode setting means for selecting one out of a plurality of modes and setting the selected mode. In this case, the timing of light quantity detection is changed according to the mode set by the mode setting means.

The modes may include a high image quality mode in which the image signal is directly output to outside without being stored in a storage and a high production mode in which the image signal is once stored in the storage and then output to the outside.

The present invention also provides an image reading device comprising:

a light source for illuminating a document;

a photoelectric converting section for converting a reflection light from the document into an analog electric signal;

a signal converting section for converting the analog electric signal into a digital signal;

light quantity detecting means for detecting a light quantity of the light source;

light quantity correcting means for correcting a fluctuation in light quantity of the illuminating means based on the light quantity detected by the light quantity detecting means;

mode setting means for selecting one out of a plurality of modes and setting the selected mode; and light quantity detection timing changing means for changing a timing of light quantity detection by the light quantity detecting means according to the mode set by the mode setting means.

According to a further aspect of the present invention, there is provided a lighting device which essentially comprises a light source for illuminating an object, light quantity detecting means for detecting a light quantity of the light source, light quantity correcting means for correcting a fluctuation in light quantity of the light source based on the light quantity detected by the light quantity detecting means and light quantity detection timing changing means for changing a timing of light quantity detection by the eight quantity detecting means.

In the lighting device, an object, such as a document, is illuminated by the light source. Then, a quantity of light illuminating the object is detected with a specified timing. Then, a fluctuation in light illuminating the object is corrected based on the detected light quantity. The above timing of light quantity detection is changeable.

In an embodiment, the lighting device also includes light quantity variation characteristic detecting means for detecting a variation characteristic of the light quantity from a time at which the light source is turned on. In this case, the timing of light quantity detection is changed according to the detected light quantity variation characteristic.

In an embodiment, the timing of light quantity detection is changed according to a duration of an illuminating time of the light source.

In still another aspect of the invention, there is provided a lighting device comprising:

a light source for illuminating a document;

light quantity detecting means for detecting a light quantity of the light source; and light quantity correcting means for predicting a fluctuation in light quantity based on a history of the light quantity detected by the light quantity detecting means, and correcting the light quantity of the light source to the predicted light quantity.

The lighting device of any one of the above embodiments together with an image reader will provide an improved image reading device applicable to a copying machine, a facsimile device, etc.

Other objects, features, and advantages of the present invention will be apparent from the accompanying drawings and from the detailed description that follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a table showing the electric characteristics of the CCD in the embodiment;

FIG. 20 is a characteristic diagram for explaining a light quantity correction deviation in the high production mode;

DETAILED DESCRIPTION OF THE PREFERRED EMBODIMENTS

The present invention will be described in detail below with reference to the drawings.

First Embodiment

Figure 1:
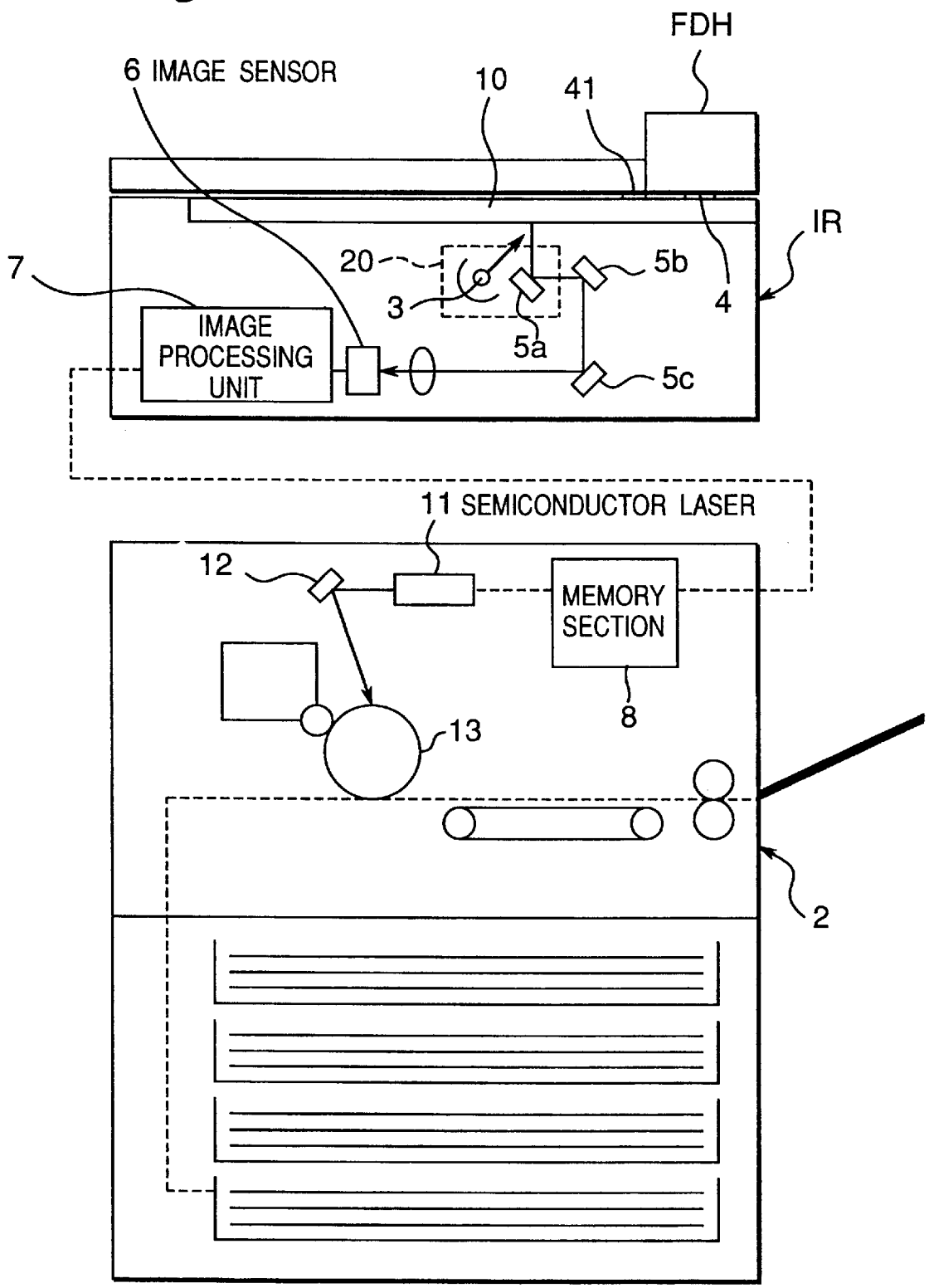
FIG. 1 is an overall schematic diagram of a digital copying machine including an embodiment of the image reading device of the present invention.

FIG. 1 shows the overall construction of a digital copying machine including an image reading section IR which serves as one embodiment of the image reading device of the present invention. This digital copying machine is constructed of the image reading section IR which reads a document image and converts it into image data, a memory section 8 which stores therein the image data supplied from this image reading section IR and a printer section 2 which outputs in a printing manner the image data supplied from the memory section 8.

The image reading section IR has an exposure lamp 3 which irradiates a document, an image forming optical system having components 5a, 5b and 5c which guide light reflected from the document, an image sensor 6 which converts input light to an electric signal, and an image processing unit 7 which includes an analog processing section for quantizing an output signal of the image sensor 6 and a digital image processing section for performing various image processing and treating operations on the quantized image signal. The image sensor 6 is mainly constructed of a CCD (Charge Coupled Device). The image reading section IR has a storage section which stores therein image data of one line for executing various adjustments, image processing and other operations and a CPU (Central Processing Unit) which monitors the data. Although not explained in detail here, this CPU also executes slider control, various communications, setting and processing of various image processing operations and so on. This image reading unit IR will be described in detail later with reference to FIG. 2.

This digital copying machine is also provided with an automatic document feeder FDH, and while feeding a document by this automatic document feeder FDH to a specified position on a document table 10, the copying machine reads the image by the image reading section IR (a so-called feed and read process).

The memory section 8 will be briefly described below. This memory section 8 is constructed of an image memory (not shown), a compressing section and a code memory (a large-capacity storage device such as HDD (Hard Disk Drive)) and a decompressing section. An image signal from the image reading section IR is written to a first image memory comprised of a ring buffer or the like of the memory section 8, thereafter compressed in the compressing section and then written to the code memory. The image data written in the code memory is read on the instructions of the CPU owned by the image reading section IR or another CPU owned by the digital copying machine, decompressed in the decompressing section, written to a second image memory section comprised of a page memory or the like, and then supplied to the printer section 2.

According to the digital copying machine shown in FIG. 1, if the document is read one time by the image reading section IR and its image data is stored in the memory section 8, then a plurality of copies are made by reading the image data a plurality of times from the memory section 8. By controlling the memory section 8, a rotation of the image, a two-in-one (two different document images are copied on one side of a single paper sheet) operation and so on are possible. In particular, when the automatic document feeder FDH is used, sheets of a document are able to be continuously read for hours until the storage capacity of the memory section 8 is depleted. Therefore, the user can make larger amounts of copies than ever.

The printer section 2 shown in FIG. 1 will be briefly described below. In the printer section 2, a semiconductor laser 11 is modulation-controlled based on the image data supplied from the memory section 8, the laser beam guided to an optical system 12 is made to scan a photoreceptor drum 13, and a printed image is obtained on a paper sheet through the electrophotographic process performing development of a latent image formed on the photoreceptor drum 13, transfer of the image and other operations. The modulation control of the semiconductor laser 11 includes a turning-on/off control, intensity control, PWM (Pulse Width Modulation) control and so on.

Figure 2:
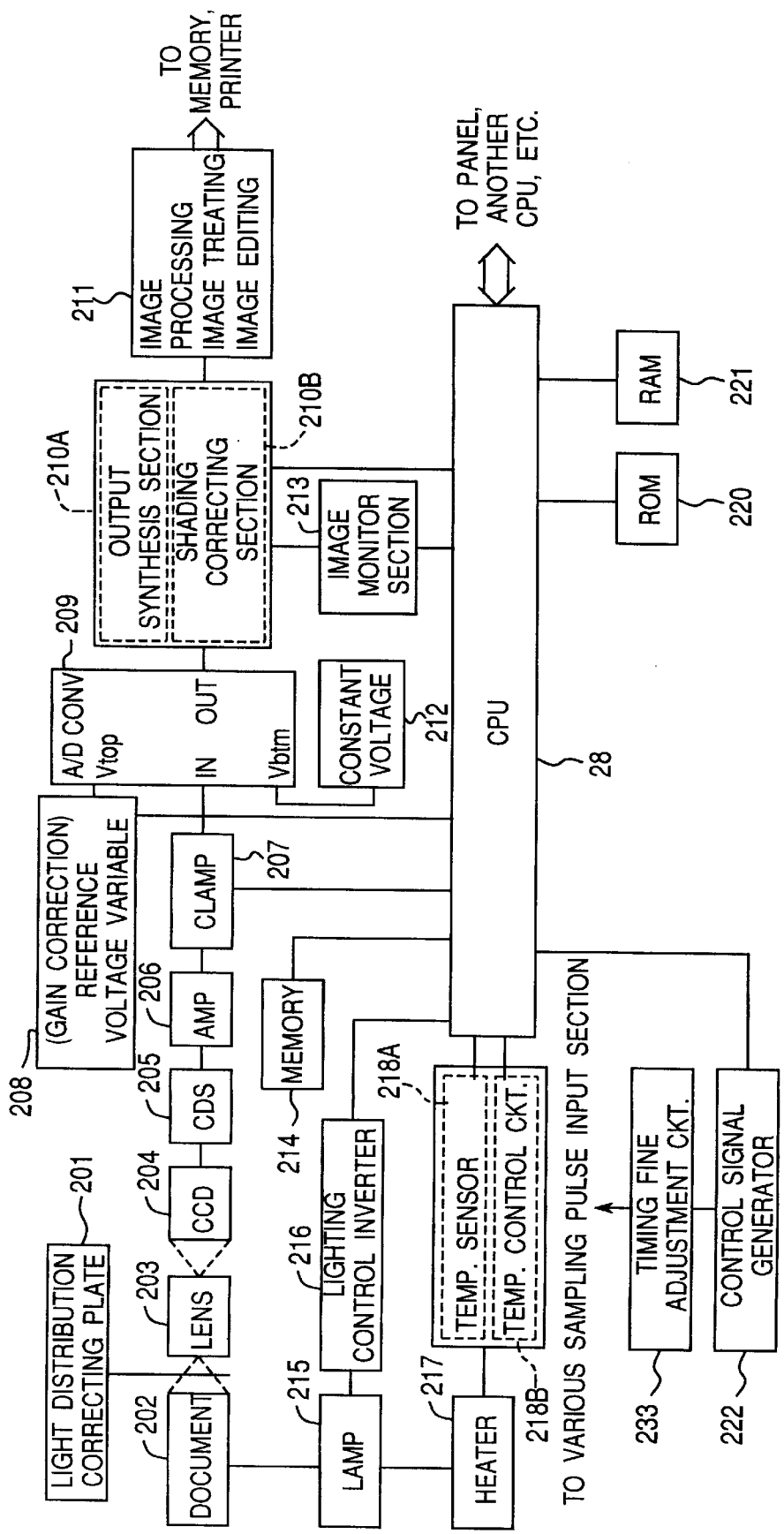
FIG. 2 is a block diagram of the image reading device of FIG. 1.

The image reading section IR (in particular, a read process involving the optical system and a data calculation process) according to the present invention will be described next with reference to FIG. 2. As shown in FIG. 2, a fluorescent lamp 215 is used as a light source 3 for illuminating a document 202. The fluorescent lamp 215 is inexpensive and is able to provide a large quantity of light with little consumption of electricity. This fluorescent lamp 215 is typically a hot cathode tube filled with mercury gas.

Figure 4:
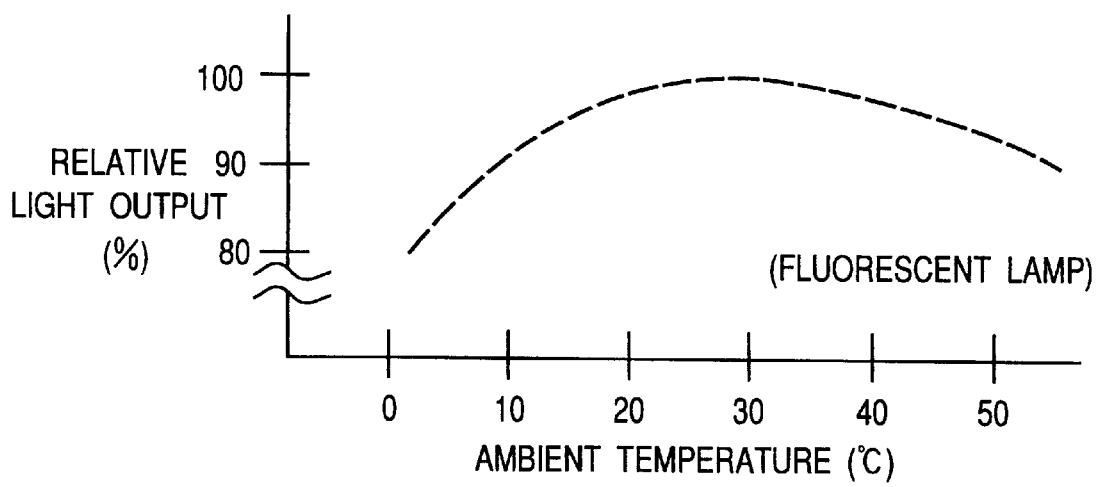
FIG. 4 is a temperature characteristic diagram showing a state in which a relative light output of the fluorescent lamp varies depending on the ambient temperature.

As shown in FIG. 4, the light quantity of the fluorescent lamp 215 significantly fluctuates depending on the tube wall temperature (environmental temperature) thereof. In order to suppress this fluctuation in light quantity, a heater 217 is wound around the fluorescent lamp 215, and this heater 217 is controlled by a temperature control circuit 218B based on a signal from a temperature sensor 218A, such as a thermistor or the like, for detecting the tube wall temperature, thereby maintaining the tube wall temperature within a specified temperature range. With this arrangement, the light quantity of the fluorescent lamp 215 is stabilized and its startup characteristic is improved.

The fluctuation in light quantity of the fluorescent lamp 215 also occurs due to the variation in mounting position of the fluorescent lamp 215 or the aging of the fluorescent lamp 215. The light quantity also differs depending on individual parts of the fluorescent lamp 215. Therefore, on the market, the light quantity is required to be adjusted not only when the fluorescent lamp 215 is replaced but also when any peripheral mechanical component is replaced.

Although the fluorescent lamp 215 (hot cathode tube) is used as the light source in the present embodiment, a halogen lamp or a discharge lamp (cold cathode tube) employing a rare gas may be used as the light source. In this case, the light quantity variation characteristic differs from that of the fluorescent lamp 215.

A lighting control inverter 216 controls the light quantity of the fluorescent lamp 215 by varying the lamp current value. For the lighting control, other control systems, such as one which varies the duty ratio of turning on and off the lamp, may be adopted.

Figure 5:
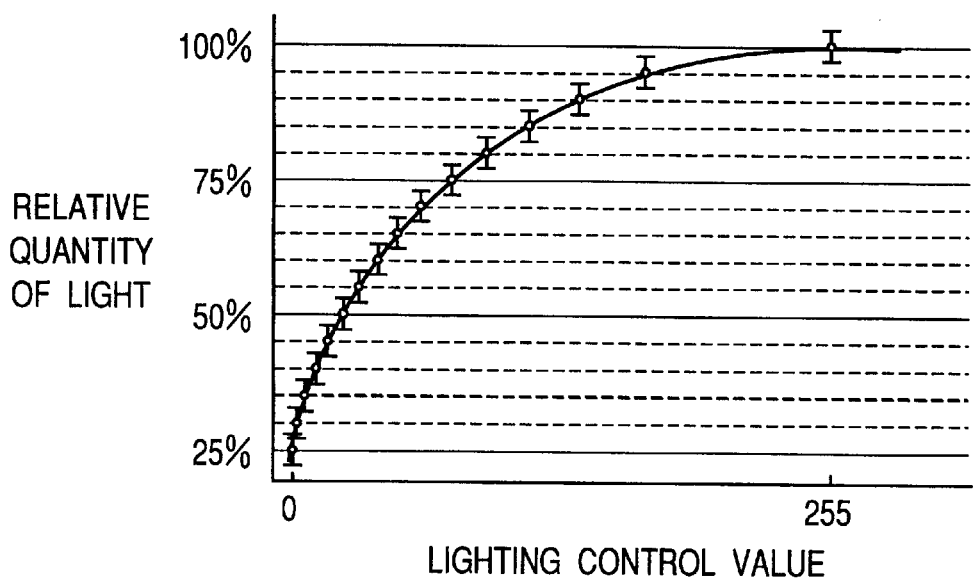
FIG. 5 shows a relationship between a lighting control value (control value) output from a lighting control inverter and a light quantity (controlled value) of the fluorescent lamp in the embodiment.

The lighting control inverter 216 is controlled by a digital control signal (indicative of a lighting control value) from a CPU 28 to thereby change a value of a lamp current to be supplied to the fluorescent lamp 215. The digital control signal represents a light quantity level, i.e., the lighting control value. As shown in FIG. 5, a relationship between the lighting control value and the relative light quantity of the fluorescent lamp 215 is a nonlinear relationship. A line extending vertically from each white circle on the curve represents a variation in relative light quantity due to variations of components. By varying the digital control signal within a range of, for example, 0 to 255, the relative light quantity can be varied within a range of 25% to 100%. The light quantity control by the inverter 216 is used for approximately adjusting the light quantity and preventing the fluctuation in light quantity depending on the variations of components and a temperature change.

Figure 6A:
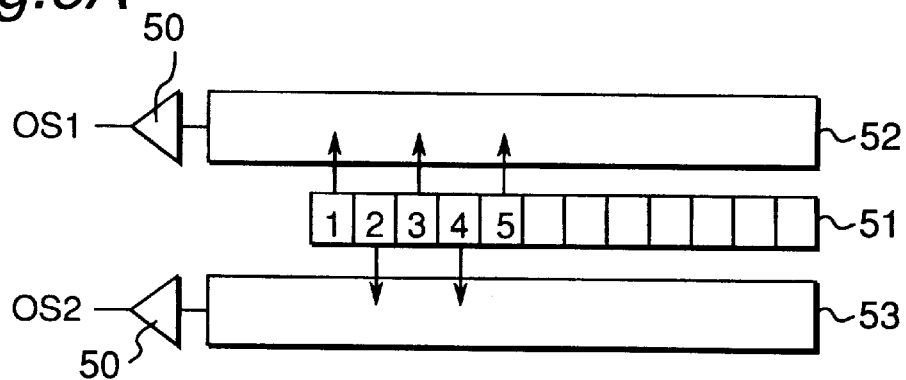
FIG. 6A is a schematic diagram showing a 2-register 2-output type as an example of the CCD construction in the embodiment.
Figure 6B:
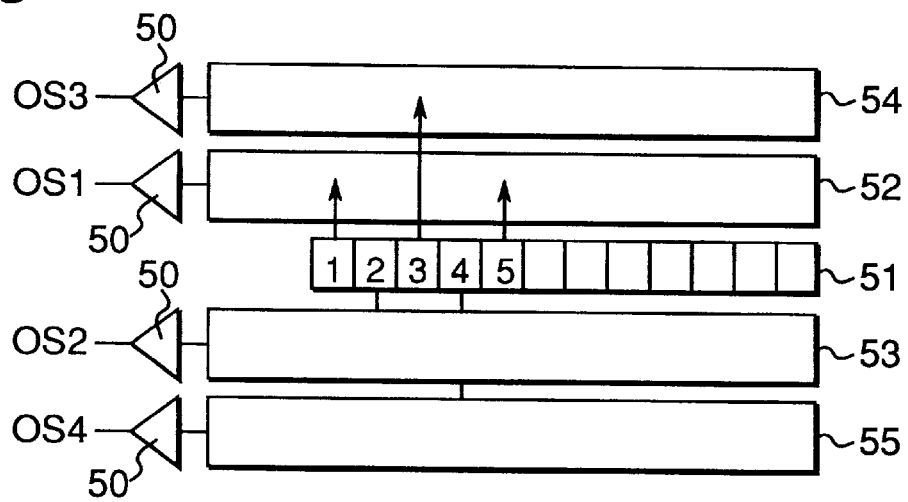
FIG. 6B is a schematic diagram showing a 4-register 4-output type as an example of the CCD construction in the embodiment.
Figure 6C:
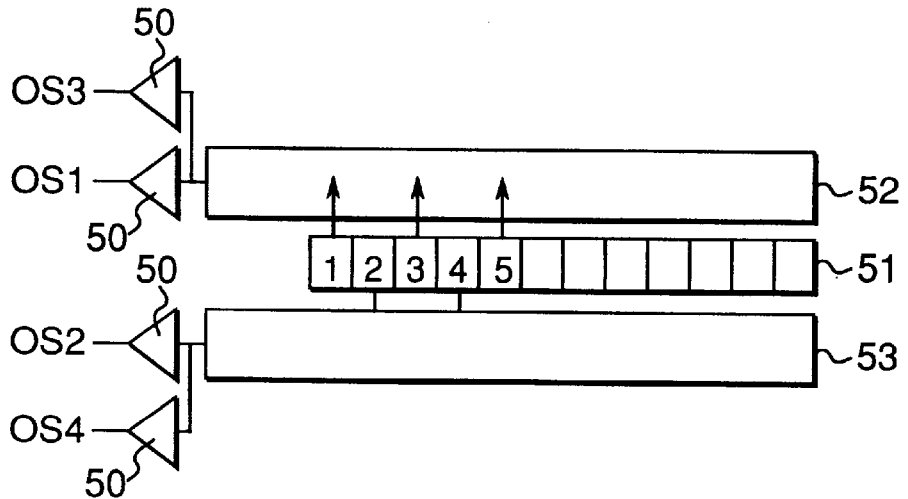
FIG. 6C is a schematic diagram showing a 2-register 4-output type as an example of the CCD construction in the embodiment.

A CCD 204, which is an example of a reading means, is a photoelectric transducer which linearly outputs a voltage in response to incident light from a lens 203. As shown in each of FIGS. 6A through 6C, the CCD 204 normally has at least two output systems OS1 and OS2 for a high-speed operation. FIG. 6A shows a 2-register 2-output normal type, FIG. 6B shows a 4-register 4-output type, and FIG. 6C shows a 2-register 4-output type. In FIGS. 6A through 6C, reference numeral 50 denotes an output buffer, reference numeral 51 denotes a photodiode, and reference numerals 52, 53, 54 and 55 denote shift registers.

The CCD is a device which has wide variations in characteristic due to variations of components, and for example, the sensitivity of the CCD 204 has a variation of ±20 to 30% depending on each component. In order to obtain a constant CCD output voltage, an exposure light quantity must be adjusted. Furthermore, the CCD 204 has a variation of more than 20% in saturated output voltage, as shown in FIG. 7.

In regard to other factors, the CCD 204 has significant variations in electric characteristics and signal output delay quantity, as indicated in FIG. 7. Furthermore, there exist a characteristic difference generated depending on a difference in the output system of the CCD 204 and a characteristic difference attributed to the warp of the chip. Furthermore, there exist variations in MTF (Modulation Transfer Function) characteristic and spectral sensitivity characteristic as well as a variation in pixel position relative to the package. Therefore, when assembling a CCD unit or product, preparatorily measured characteristic values of the CCD and values to be used as a reference in executing various operations are stored in a storage device provided in the product.

Referring again to FIG. 2, the image reading section IR includes a CDS section 205 having a sample-and-hold function represented by CDS (Correlated Double Sampling), an AMP (Amplifier) section 206 having an amplifying function and a clamp section 207 having a clamping function. Further, the image reading section IR has a quantizing function, an output combining function and so on, as described later.

The CDS section 205 takes a difference between a signal in a period representing a black output and a signal in a signal period within one pixel of the CCD 204 by two inputted sampling pulses, thereby removing a noise portion generated by a drive pulse (RS) from the output waveform of the CCD 204 and taking out only the stable portion of the output signal. The variation in temperature characteristic of the CCD 204 itself is absorbed here. Factors causing the variation at the CDS section 205 are a variation in gain (about ±30%) of the CDS section 205 itself, a variation (1 V, for example) in input signal amplitude limit, an error attributed to a difference in sampling position, and so on.

Figure 8:
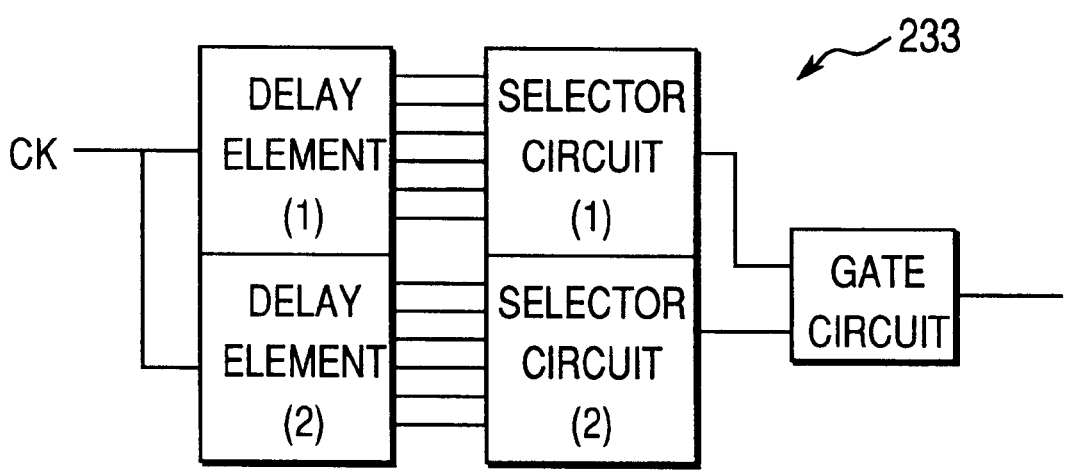
FIG. 8 is a block diagram showing an example of a timing fine adjustment circuit in the embodiment.
Figures 9A, 9B, 9C, 9D:
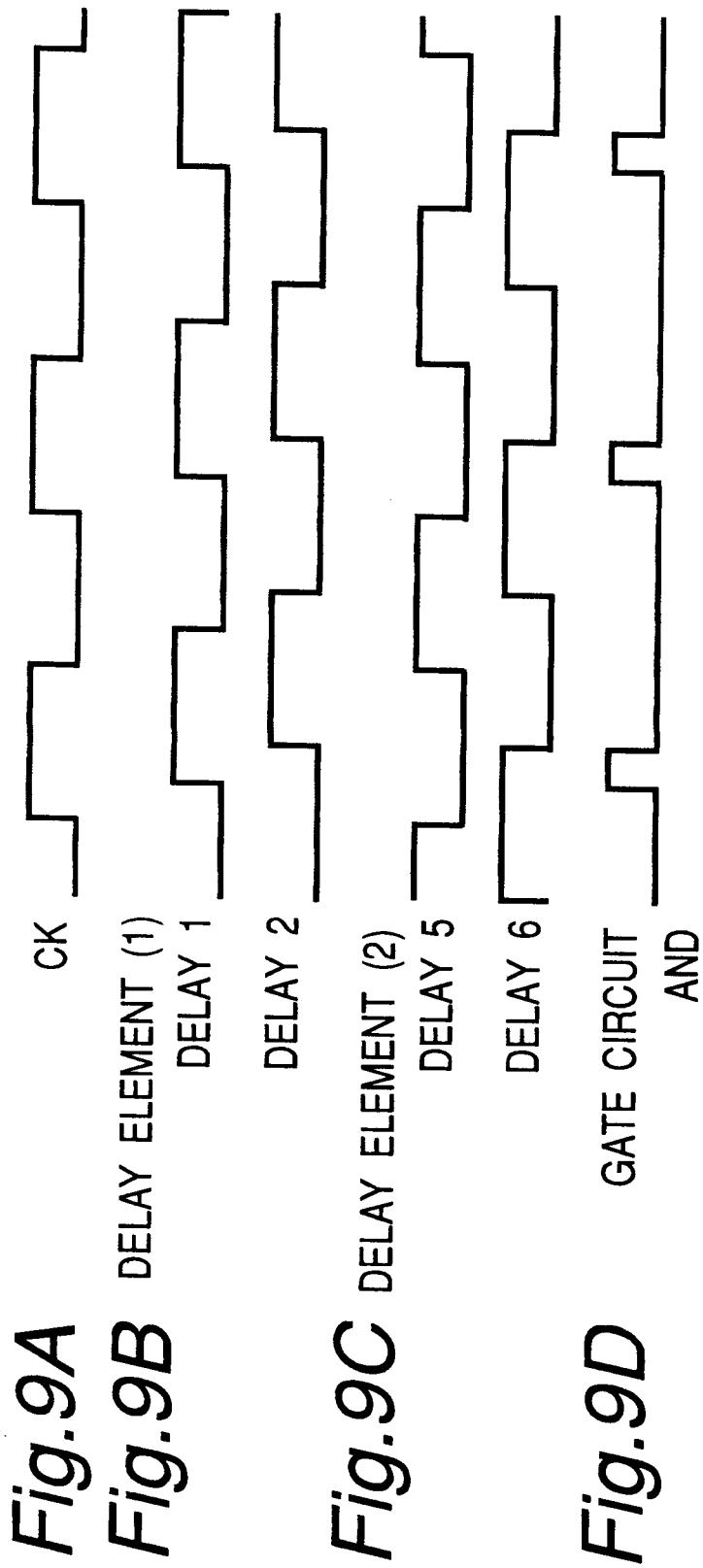
FIGS. 9A, 9B, 9C and 9D are timing charts of the timing fine adjustment circuit.

When executing a high-speed operation, the cycle of one pixel is very short, and therefore, a great many noises are generated on the CCD output waveform. Therefore, in order to retain the correct data, sampling must be executed with a sampling pulse width of the order of nanoseconds ($10^{-9}$ sec) and the adjustment of the sampling position must be executed on the order of nanoseconds ($10^{-9}$ sec), too. Therefore, a timing fine adjustment circuit 233 as shown in FIG. 8 is necessary. This timing fine adjustment circuit 233 is a circuit for finely adjusting the sampling pulse width and the sampling timing.

As shown in FIGS. 9A through 9D, the timing fine adjustment circuit 233 adjusts the sampling pulse width and sampling timing by controlling the timing of at least one reference pulse CK. Then, the control value of the adjustment is stored in a storage in the assembling stage, and when operating the product, the CPU 28 reads the control value and sets the same in the timing fine adjustment circuit 233. Although the CDS section 205 executes the correlated double sampling in this case, it may render the sample-and-hold function in another form.

The AMP section 206 amplifies by means of an operational amplifier the signal subjected to the sample-and-hold operation by the CDS section 205. At this time, an amplification factor (also called the gain) varies depending on the variation in characteristics of the operational amplifier itself and the variation of elements (resistors and so on) for determining the amplification factor. Although the amplification factor of the AMP section 206 is fixed (excluding the variations and characteristic changes) in this case, the amplification factor of the AMP section 206 may be controlled to be arbitrarily changed by means of a digital-to-analog (D/A) converter or the like similar to the clamp section 207 described below.

The clamp section 207 has a D/A converter and operates to supply a setting signal received from the CPU 28 to an analog-to-digital (A/D) converter 209 via the D/A converter and vary the black reference voltage of the CCD 204 to a level so that the black reference voltage of the CCD 204 becomes a lower limit voltage level of the A/D converter 209. By these operations, optimum quantization of the CCD output is achieved. Factors of variations at the clamp section 207 are: a variation of the clamp section 207 itself, a variation in gain and a conversion error of the D/A converter, a variation in reference voltage, and so on. The term "black reference voltage" of the CCD 204 refers to a voltage that is output when the pixels of the CCD 204 are optically shielded. By adjusting the black reference voltage of the CCD 204 to a level set for every line, variations with time in temperature characteristics and so on of the elements inclusive of the CCD 204 and circuit system are absorbed.

The A/D converter 209 changes the reference voltage (on the top side) by a signal supplied from the CPU 28 via the D/A converter, thereby making the CCD output voltage from the clamp section 207 fall within the intended read density range. This A/D converter 209 quantizes the CCD output voltage to, for example, 256 gradation levels (i.e., conversion to a digital signal). Since the cycle of one pixel is very short during the high-speed operation, the A/D converter 209 necessitates a fine adjustment circuit for adjusting the (quantization) sampling position, similarly to the CDS section 205. The A/D converter 209 tolerates the maximum quantization range setting at a level at which no saturation occurs even when the CCD output voltage and the circuit gain have maximum values. Factors causing variation in the A/D converter 209 are: the gain and the conversion error of the D/A converter itself, a variation in its reference voltage, and so on, similarly to the clamp section 207. Furthermore, there is a possibility that the sampling position causes a variation (error) in the data to be quantized.

An output synthesis section 210A combines two digital signals processed parallel in conformity to the two outputs of the CCD 204 into a serial signal in order of the pixels read by the CCD 204. The timing of supplying the synthesis clock for triggering the synthesis of the outputs is important. Particularly, when the CCD 204 has a high operation speed or when there are three or more outputs of the CCD 204, a margin for such timing is very small. Therefore, the timing of supplying the synthesis clock must be finely adjusted according to the timings of operating the CDS section 205 which serves as the sample-and-hold section, A/D converter 209 and so on. The timing of supplying the synthesis clock may be fixed or variable according to a preparatorily stored CCD output delay time or according to the sampling timing of, for example, the CDS section 205.

Next, a shading correction section 210B corrects the light distribution nonuniformity of the exposure lamp 3, i.e., the fluorescent lamp 215, a total light distribution nonuniformity of the optical system of the lens 203, and a sensitivity nonuniformity of pixels of the CCD 204. The correction is performed through a calculating operation based on the data of one line obtained by reading a white reference density plate (a shading correcting plate) 41 shown in FIG. 1 by the CCD 204. In this embodiment, the exposure lamp 3 is constructed of the fluorescent lamp 215, and therefore, difference in light quantity between a center portion and an edge portion is significant. When the exposure lamp 3 is constructed of a halogen lamp, a light quantity ripple in the filament exists.

An image monitor section 213 has a function of making the CPU 28 monitor one line data in the main scanning direction in terms of hardware. This monitoring function includes the following cases. (1) The CPU 28 directly monitors the data of at least one point (in a specified address) in one line. (2) Image data of one line in the main scanning direction is stored to a memory 214, and the CPU 28 monitors the image data in the memory 214. (3) A histogram of one line or a plurality of lines is formed, and the CPU 28 monitors the result. (4) An edge address of one line or a plurality of lines is detected, and the CPU monitors the detection result.

In this embodiment, in addition to designing an appropriate board wiring pattern and reinforcing the GND (ground), the processing circuits from the CCD 204 via the A/D converter 209 to the output synthesis section 210A are constructed as one circuit board. With this arrangement, external noises and radiation noises are reduced, thereby reducing the deterioration of signal-to-noise (S/N) ratio due to a possible increase of noises in the high-speed operation.

Furthermore, in the present embodiment, the lens 203, the above circuit board and the support members therefor are integrated into one unit (referred to as a CCD unit hereinafter), and mechanical adjustments of the focus position and so on inside the unit have been done. With this arrangement, parts can be easily replaced on the market.

Furthermore, the aforementioned board is mounted with the memory 214 including an electrically readable and writable storage device for storing therein the aforementioned read characteristics in the assembling and adjusting stages. This storage device may be provided by, for example, a semiconductor such as a memory, or a non-semiconductor object such as a DIP switch or a board pattern if it is used for only a reading purpose. Then, the read characteristics to be stored into the memory 214 are as follows. First, information to be preparatorily stored includes the following items (i) through (v).

(i) Deviations of CCD read characteristics such as, for example, sensitivity, saturated output voltage, electric characteristics such as a difference between two or more output systems, and so on from respective standard values.

(ii) Deviations of analog total gains such as an S/H (sample-and-hold) gain, an input limit voltage, a gain of the amplifying section (AMP section 206), a gain of the clamp section 207, and a gain of the quantizing section (A/D converter 209) from respective standard values.

(iii) Sampling timing information, i.e., timing control values for the CDS section 205 which serves as the S/H (sample-and-hold) section, the A/D converter 209 which serves as the quantizing section, the output synthesis section 210A and so on.

(iv) Exposure light quantity and initial data, i.e., a lighting control value determined by the combination of the optical components such as the lamp with the CCD unit in the assembling stage, digital values at the time of reading the reference white plate, and a value representing a light distribution ratio.

(v) Information necessary in the assembling and adjusting stages.

Information which may be rewritten in the assembling, adjusting or operating stage includes the following items (vi) through (ix).

(vi) Defaults to be set as temporary values for various adjustments, used when the adjusted value is obviously abnormal.

(vii) Places and number of times of the occurrence of the aforementioned abnormalities, cautions and troubles.

(viii) Number of times of read in the case of manual document placement, automatic document feed, double-sided copying and so on.

(ix) Number of times of lamp lighting.

Various adjustment and correction items will be described next in the order of (a) a first light quantity adjustment, (b) a second light quantity adjustment, (c) an offset adjustment and (d) a gain adjustment.

(a) The first light quantity adjustment is accompanied by detection of a light quantity peak and is executed when turning on the power or effecting software reset at the time of assembling and adjusting a product and replacing a component on the market. In this case, the components to be replaced include not only the fluorescent lamp 215 but also mechanical components (reflection mirror of the image forming optical system 5, fluorescent lamp supporting members and so on) which are factors in determining the incident light quantity on the CCD 204, and the CCD unit. As stated above, the CCD unit is constructed of one circuit board for processing signals from the lens 203 via CCD 204 to the output synthesis section 210A, and components for supporting and positioning the circuit board. Thus, the CCD unit can be easily replaced.

(b) The second light quantity adjustment is executed for absorbing the reduction in light quantity at the time of continuous read. When reading large amounts of documents by the automatic document feeder FDH, the fluorescent lamp 215 may continue to be lit for hours. It is when images are read until the image memory section 1 comprised of a hard disk becomes full or when image outputs are processed in parallel that the fluorescent lamp 215 is continuously lit. If the fluorescent lamp 215 is continuously lit as described above, the tube wall temperature (ambient temperature) of the fluorescent lamp 215 is increased by the heat generated from the fluorescent lamp 215 itself, the CCD 204, the circuit board and so on. For this reason, the light quantity reduces by 30 to 50% from a light quantity immediately after turning on the lamp. Therefore, the CPU 28 predicts a CCD output voltage with respect to a value adopted in executing a gain adjustment described in the next item (d), similarly to the aforementioned first light quantity adjustment. When the predicted CCD output voltage is lower than a lower limit value of the CCD output voltage guaranteeing the image quality, the CPU sets a lighting control value, i.e., a light quantity level value immediately before the next gain adjusting time such that the CCD output voltage does not become lower than the lower limit value.

The next (c) offset adjustment and (d) gain adjustment are intended to perform fine adjustment functions after a rough light quantity adjustment since the offset and gain adjustments cannot adjust the light quantity with the accuracy of the quantization steps (256 gradation levels).

(c) The offset adjustment controls a clamp voltage so that the digital value of the CCD output voltage becomes "0" in a state in which the pixels of the CCD 204 are optically shielded, and this adjustment is carried out at least at the time of turning on the power. That is, the offset adjustment is intended to adjust the black level during a read operation. It is to be noted that the digital value of the CCD output voltage in the optically shielded state depends on each system.

(d) The gain adjustment is executed basically immediately before starting reading of the document 202 since the fluorescent lamp 215 has a wide fluctuation in light quantity. The gain adjustment is intended to control the reference voltage of the A/D converter 209 so that the optimum quantization is achieved while reading one page.

Trouble/warning Process

The trouble/warning process will be described next. In executing the gain adjustment, the CCD output voltage is predicted from a monitored light quantity value obtained by reading the reference density plate 41. A warning for requesting the replacement of the light source lamp (fluorescent lamp 215) is output when the predicted voltage is below a minimum image quality guarantee voltage, or a trouble alarm is issued when the light quantity is extremely little. This alarm may be displayed on the operation panel, sent to a service station by way of a telephone line or the like or used for stopping the machine.

It is to be noted that the arrangement shown in FIGS. 1 and 2 is common to all embodiments described herein, and that the foregoing description is applied to the second and third embodiments described later.

The operation sequence (main routine) of the first embodiment will be described next with reference to FIGS. 10 and 11. First, a main switch is turned on from a state in which the power is disconnected, so that the power is turned on (S1001). Then, a warm-up is started to increase the tube wall temperature of the fluorescent lamp Ad 215 so that the light quantity of the fluorescent lamp 215 becomes stable (S1002). When the warm-up is completed, a message indicating a copyable state is displayed to inform the user of the fact that copying can be performed (S1003). When the copying mode has been set (S1004), the system waits for the depression of a copy start button (S1005).

Upon depression of the copy button, the number "n" of document sheets is incremented to "1" (S1006), and gain adjustment is executed for correcting the variation in light quantity of the fluorescent lamp 215 and the variation in gain of the circuit for processing the output signal of the CCD 204. Further, in order to reduce image noises in the main scanning direction due to the light distribution nonuniformity of the fluorescent lamp 215 and the variation in sensitivity of the pixels of the CCD 204, shading correction is executed (S1007). Then, it is discriminated whether the document 202 has been set in position manually or set in the feed-and-read manner by means of the automatic document feeder FDH. If the document has been set manually, a scan by a slider 20 is started (S1008) and the image of the document 202 is read (S1009).

If the document 202 has been set in the automatic document feeder FDH, the slider 20 is moved to a document read position (S1010), a first sheet of the document starts to be conveyed (S1011) and the document image is read (S1012). Further, if a next sheet of the document exists in step S1016, light quantity correction is executed for correcting the fluctuation in light quantity of the fluorescent lamp 215 (S1013), the next sheet is conveyed (S1014) and its image is read (S1012). When the document to be read is depleted in step S1016, the read sequence ends immediately.

Figure 12:
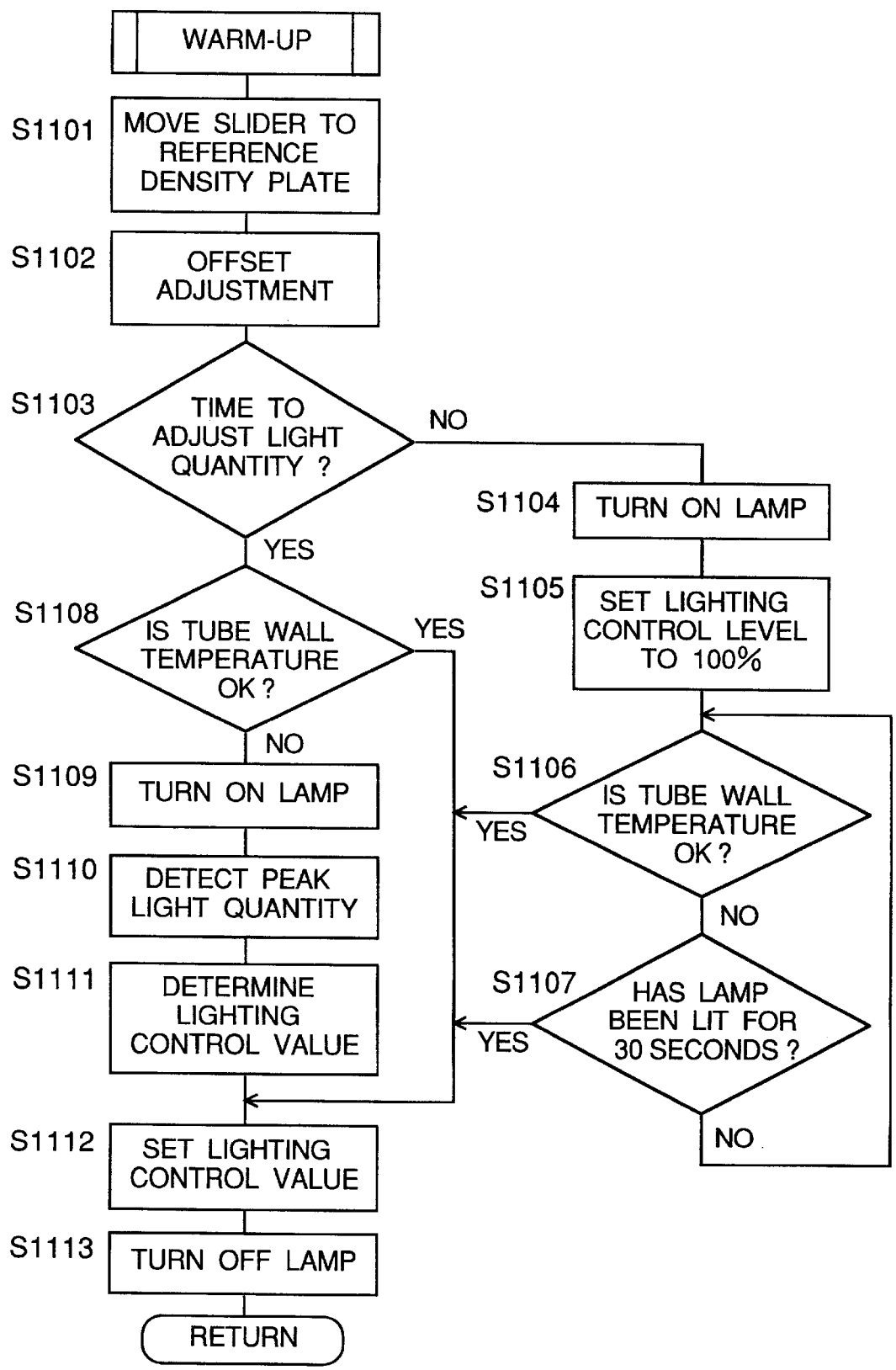
FIG. 12 is a flowchart for explaining a warm-up operation in the main routine.

The warm-up operation of the fluorescent lamp 215 to be executed at the time of turning on the power in step S1002 will be described next with reference to FIG. 12.

First, the slider 20 is moved to a position opposite to the reference density plate (shading plate) 41 with the fluorescent lamp 215 kept unlit (S1101) and the offset adjustment is performed (S1102). The offset adjustment is an adjustment for canceling the DC fluctuation of the CCD output signal and a deviation from the reference value in the analog processing circuit.

Then, it is checked whether or not now is time to adjust the fluorescent lamp light quantity (S1103). If not, the fluorescent lamp 215 is turned on (S1104) and the lighting control value is set to 100% (S1105).

Then, the tube wall temperature of the fluorescent lamp 215 is monitored. If the temperature becomes a specified temperature (S1106) or if 30 seconds have elapsed since the lamp was turned on (S1107), the preceding lighting control value is set as it is (S1112).

On the other hand, if it is determined that now is time to adjust the light quantity in step S1103, a lighting control value is determined according to the startup characteristics of the fluorescent lamp 215.

Characteristics of the light quantity variation will be now described first.

Figure 3:
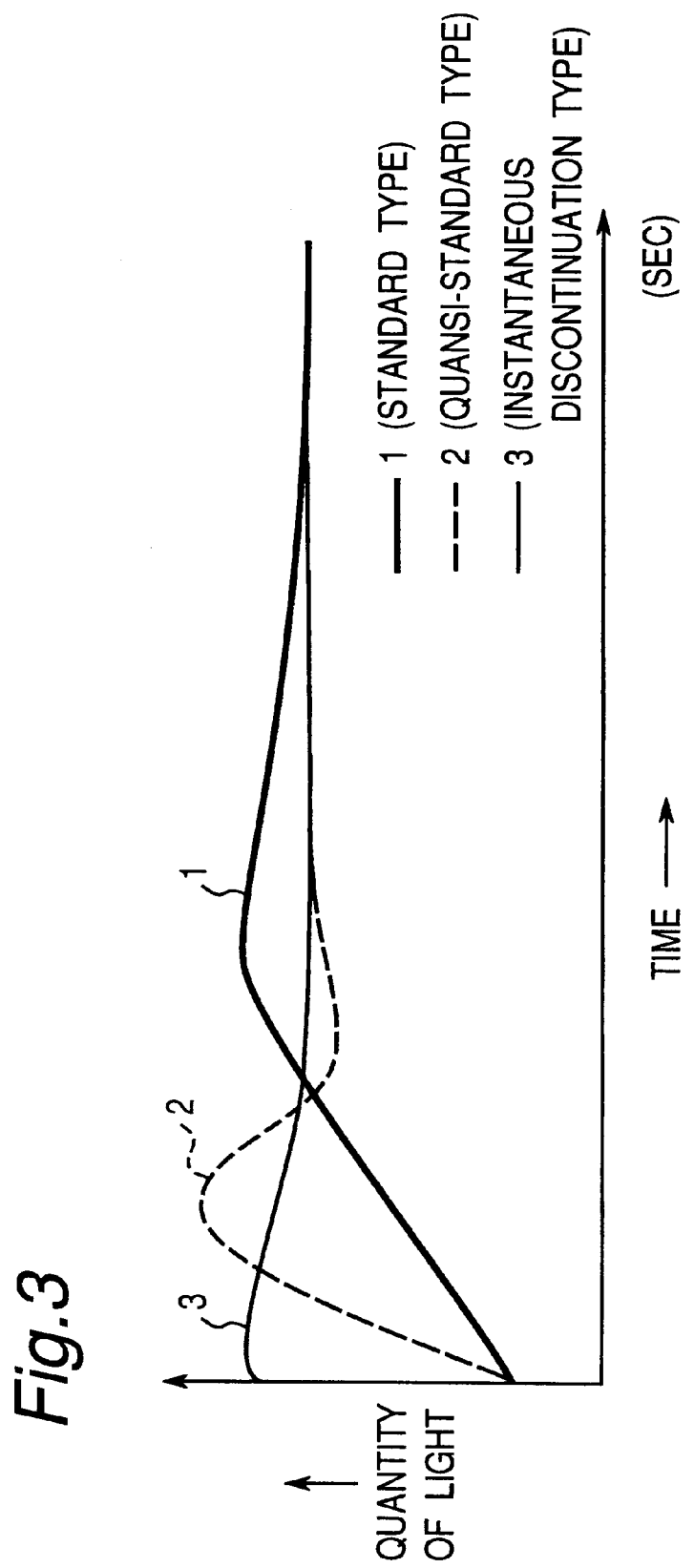
FIG. 3 shows three typical examples of startup characteristics of a fluorescent lamp included in the image reading device.

As shown in FIG. 3, there are three types of startup light quantity variation curves 1, 2 and 3 depending on the difference in lighting condition of the fluorescent lamp 215. The startup light quantity variation curves 1, 2 and 3 have varied transitions and peak values depending on the environmental temperature, the preceding lighting condition, the standby time and so on.

The light quantity variation curve 1 is a standard curve that is a general startup characteristic curve. The light quantity variation curve 2 is a quasi-standard type characteristic curve, which is also called "peaky type". The characteristic curve of the quasi-standard type is of a relatively rare characteristic that possibly occurs depending on the intra-tube temperature conditions of the fluorescent lamp 215. The light quantity variation curve 3 is called "instantaneous discontinuation type", and is a characteristic curve occurring when the power is turned off and then turned on again in a short time. Therefore, the longer the power-off time before the reactivation of power is, the closer the light quantity variation curve 3 approaches the light quantity variation curve 1.

It is determined which of the three types of the light quantity startup patterns shown in FIG. 3 the actual startup characteristic of the fluorescent lamp 215 belongs to, and lighting control according to the determined pattern is executed. The lighting control is executed by first detecting the tube wall temperature of the fluorescent lamp 215 (S1108), determining the type of the startup characteristic curve based on the detected tube wall temperature, and setting a lighting control value (S1112). If the detected tube wall temperature has reached a specified temperature, the actual startup characteristic of the lamp 215 is determined to be of the instantaneous discontinuation type 3 and the preceding lighting control value is adopted as it is for the setting.

If the detected tube wall temperature is lower than the specified temperature in step S1108, it is determined that the startup characteristic of the fluorescent lamp 215 is of the standard type 1 or the quasi-standard (peaky) type 2 and lighting control is performed. In this lighting control, the fluorescent lamp 215 is turned on (S1109) and the peak value of the light quantity is detected (S1110). Then, a light quantity in the subsequent stable period is predicted from the detected peak light quantity value to determine the lighting control value (S1111), and this lighting control value is set (S1112). Then, the fluorescent lamp 215 is turned off (S1113) and the warm-up operation ends.

The copying mode setting (S1004) in the main routine shown in FIG. 10 will be described next with reference to FIG. 13.

Figure 14:
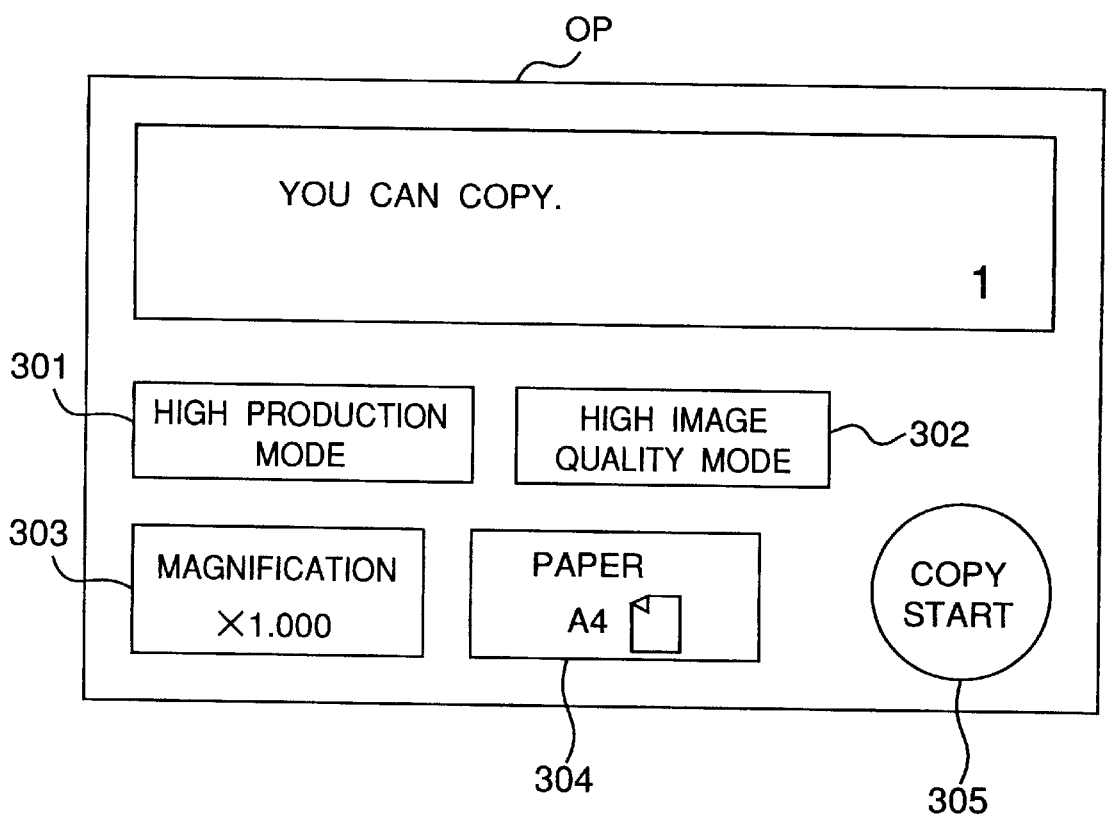
FIG. 14 is a top view of an operation panel.

First, the system waits for the event that a button 301 or 302 on an operation panel OP shown in FIG. 14 is depressed for selecting a copying mode (S1201).

The operation panel OP shown in FIG. 14 is provided with a high production mode button 301 and a high image quality mode button 302 for the copying mode setting, a button 303 for setting a magnification, and a button 304 for selecting a paper type.

Once the copying mode selecting button 301 or 302 is depressed, the mode represented by the depressed button is judged (S1202). If it is determined that the high image quality mode button 302 has been depressed (S1203), a data through mode is set (S1204) in which the read data is subjected to image processing and the thus obtained data are supplied to the printer section 2 directly and not by way of the memory 214.

The high image quality mode eliminates possible occurrence of image deterioration accompanying the data compressing and decompressing operations in storing the data into the memory 214, and therefore, a high-quality image output is achieved.

Then, the copying mode flag is set to "1" indicating the high image quality mode (S1205).

If the copying mode set on the operation panel OP is the high production mode (S1206), a memory mode is set (S1207) in which the read data is once stored in the memory 214 and then transferred to the printer section 2.

In the high production mode, the read image data is once stored in the memory 214, whereby complicated edition processing such as electronic sorting, image rotation, n-in-one (n different document images are copied on a single paper sheet) and so on can be rapidly executed, thereby improving the copying productivity.

Next, the copying mode flag is set to "0" representing the high production mode (S1208).

In order to start copying in this embodiment, the document 202 is first placed on the document table 10, then a magnification is set by means of the magnification key 303 on the operation panel OP, a copying mode is set by means of the copying mode key 301 or 302, and the paper is selected by means of the key 304. Then, a copy quantity (the number of copies) is set by a ten-key pad (not shown), and a copy-start key 305 is depressed when the above preparation for the copying is completed.

Figure 10:
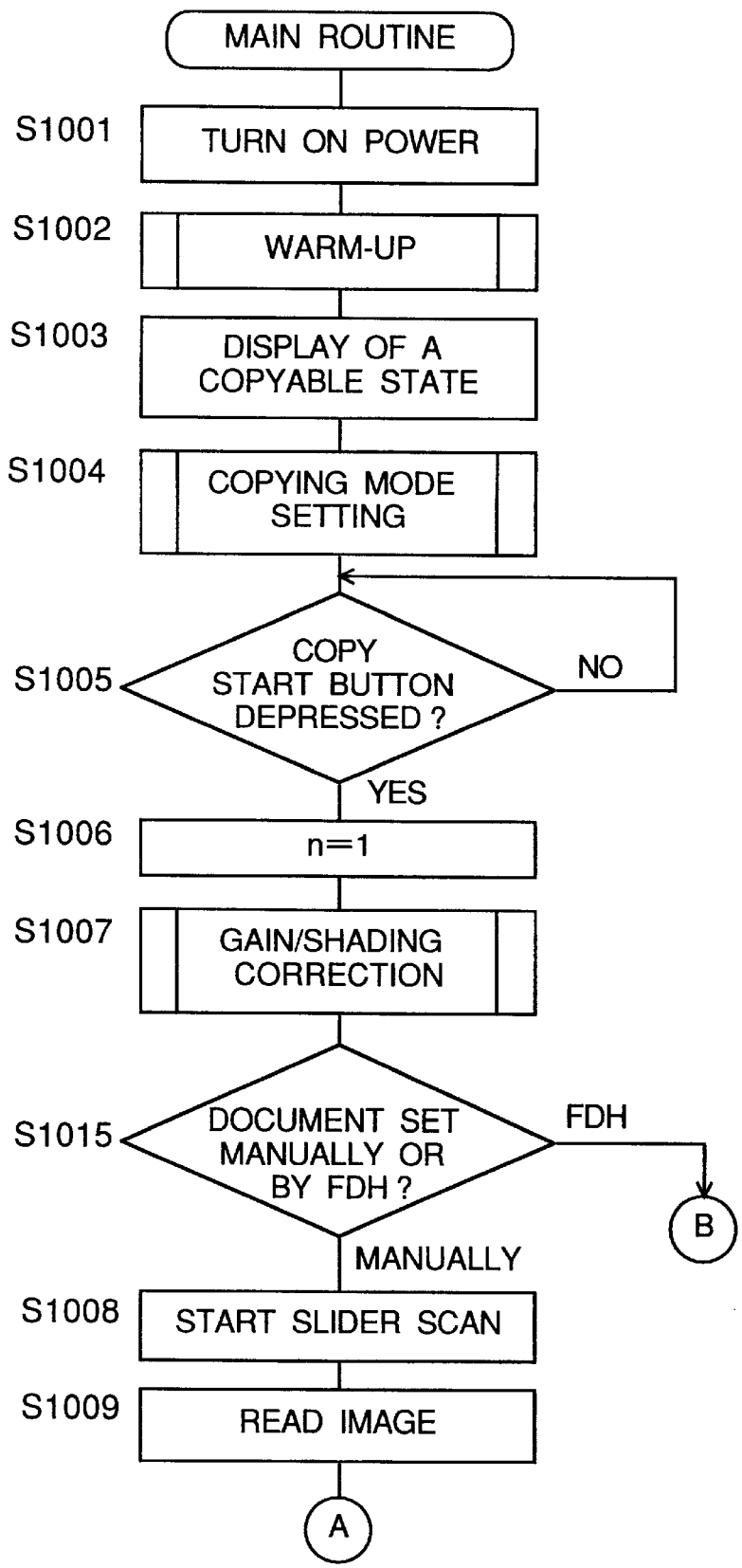
FIGS. 10 and 11 are flowcharts for explaining a main routine of a read operation of the above embodiment.
Figure 11:
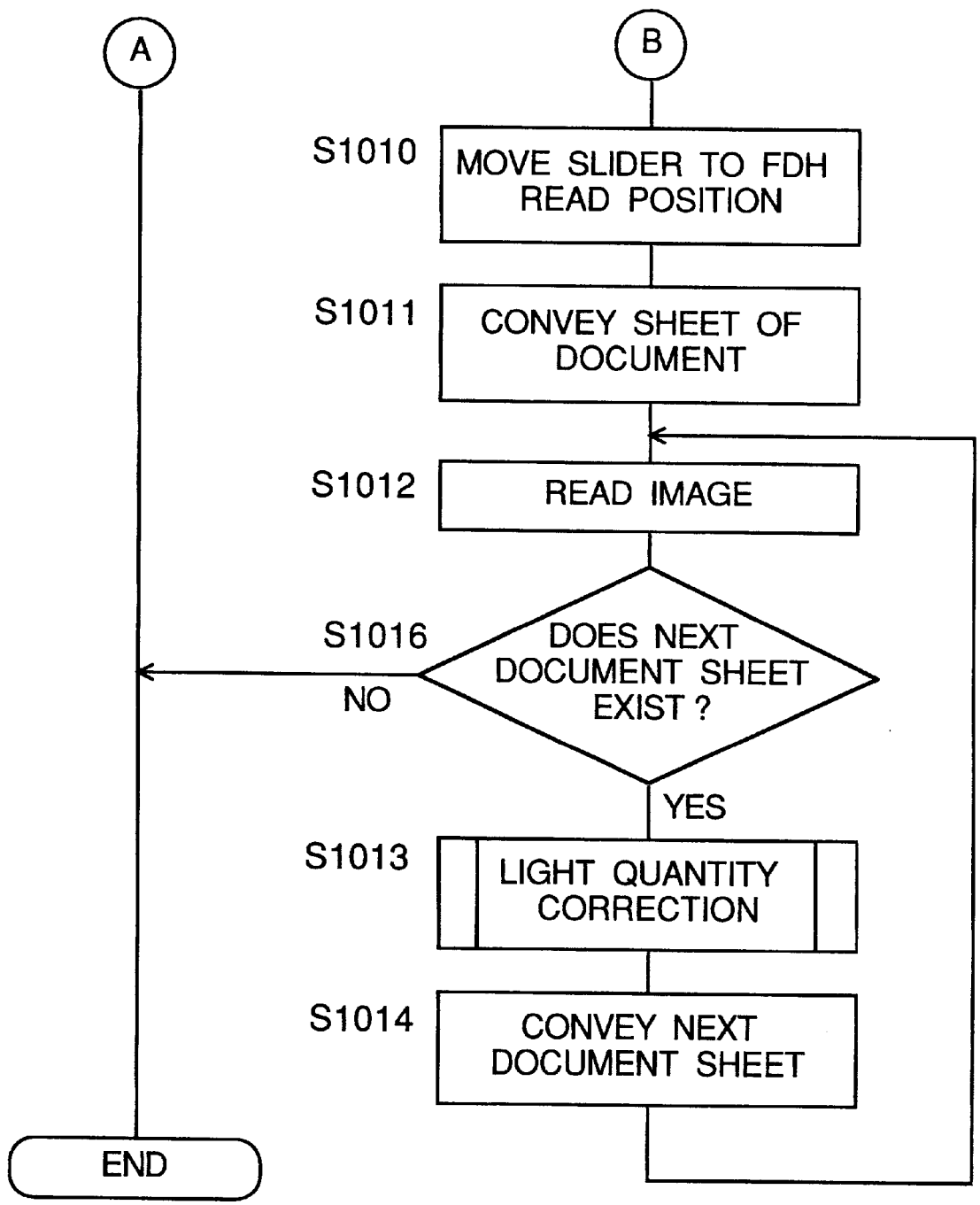

Then, the main routine shown in FIG. 10 starts to execute a specified operation, thereby copying the document image.

Figure 13:
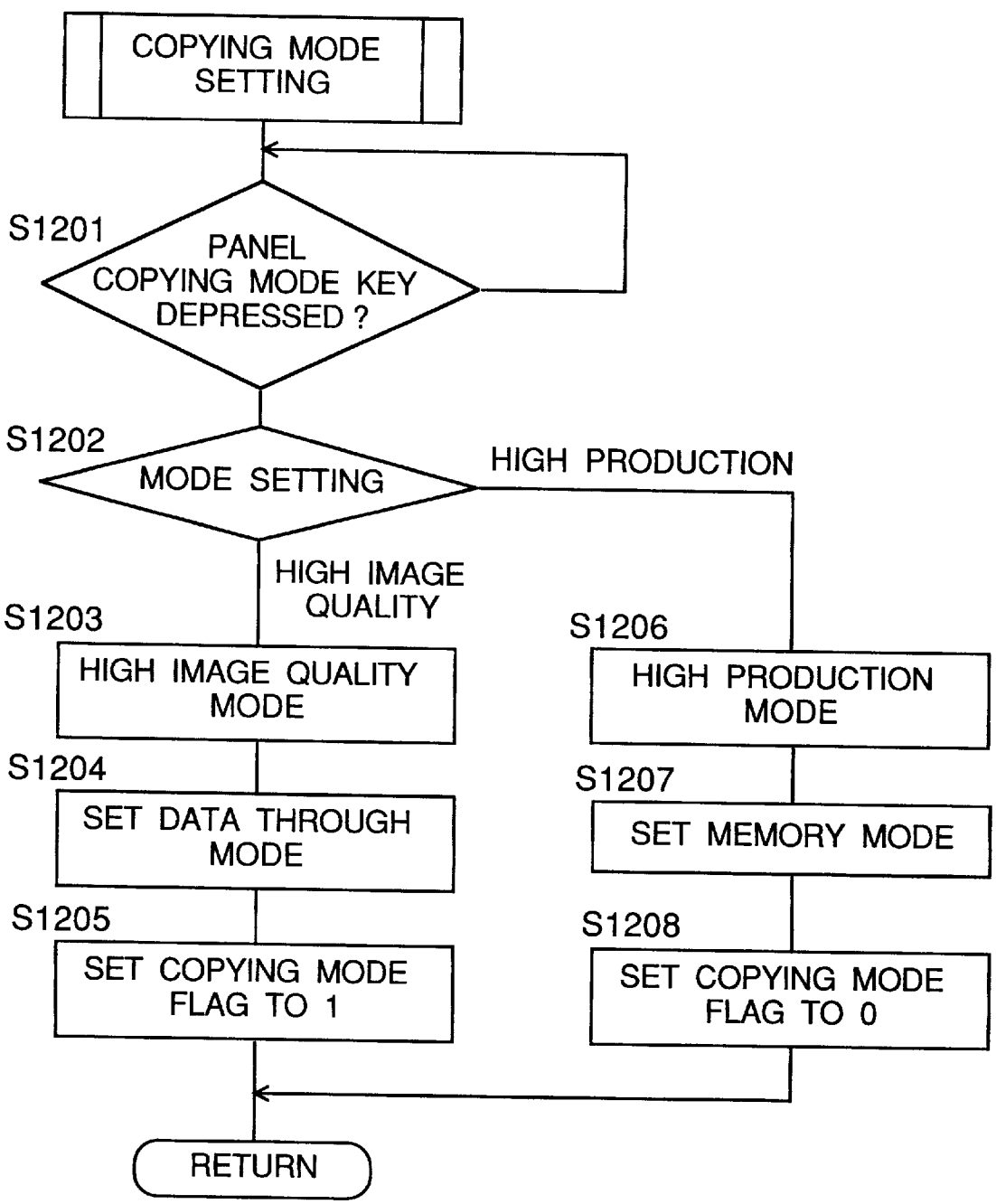
FIG. 13 is a flowchart for explaining a copying mode setting operation in the main routine.

When the high image quality mode key 302 or the high production mode key 301, which are the copying mode selecting keys, is depressed, the copying mode is set to the mode of the depressed key according to the copying mode setting flow shown in FIG. 13.

Figure 15:
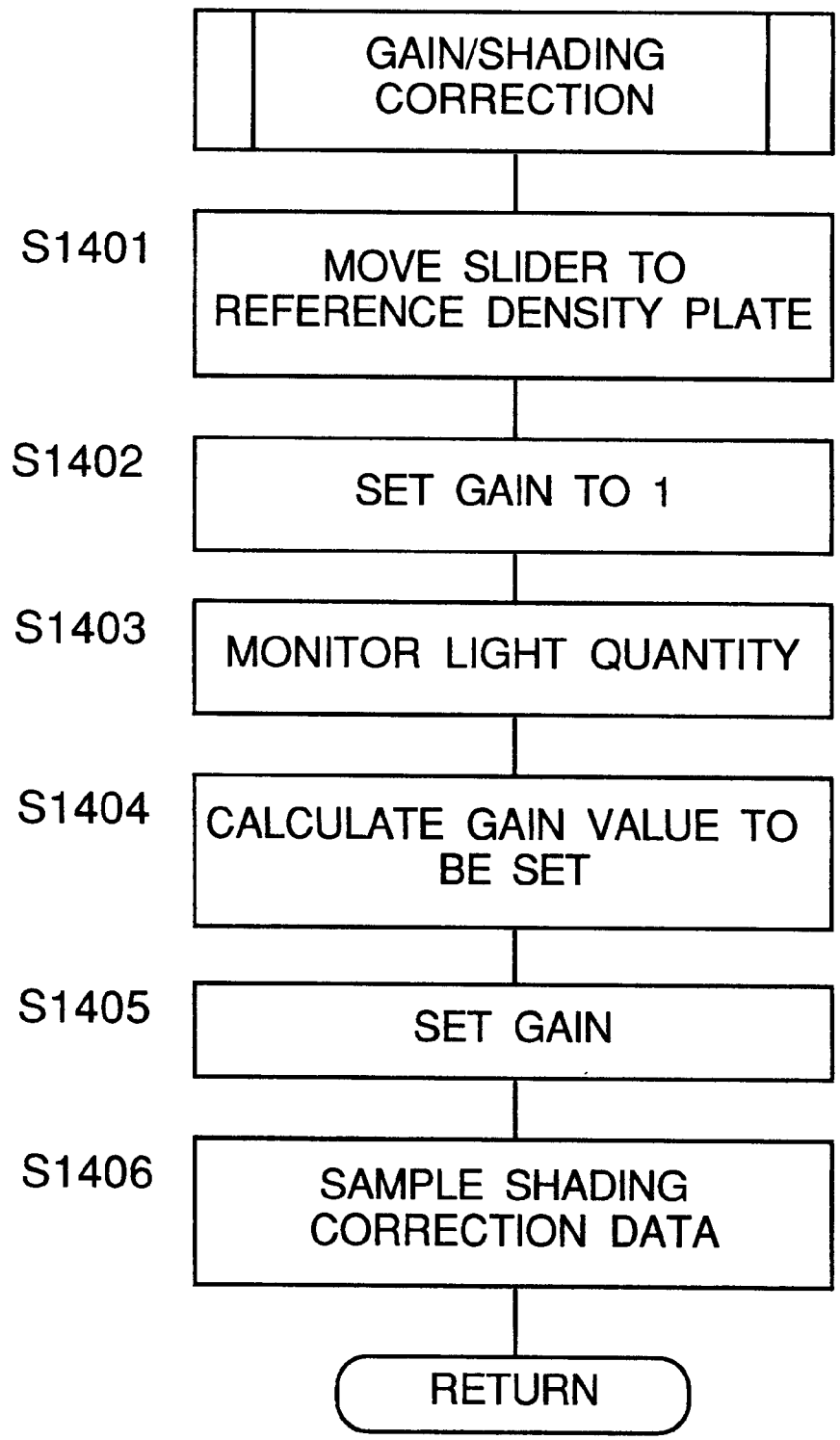
FIG. 15 is a flowchart for explaining a gain/shading correcting operation in the main routine.

A process flow for executing the gain correction and the shading correction (S1007) in the main routine shown in FIG. 11 will be described next with reference to FIG. 15.

First, the slider 20 is moved to a position in which the reference density plate 41 is read (S1401) Then, the gain is set to 1, or a one-fold magnification so that the input signal to the A/D converter 209 is not saturated (S1402), and the light quantity of the fluorescent lamp is monitored (S1403).

The light quantity monitoring may be executed by means of a special-use monitoring device, however, it is executed in this case by setting the gain of the analog circuit to a specified value (one, for example) and reading the reference density plate 41 by means of the CCD 204.

Then, the gain magnification is calculated from the monitored light quantity value (S1404), and gain setting is performed (S1405). After the gain setting is appropriately performed, shading correction data are sampled for correcting the fluorescent lamp light distribution characteristics and the variation in sensitivity between the pixels of the CCD 204 (S1406), and the process flow returns.

Figure 16:
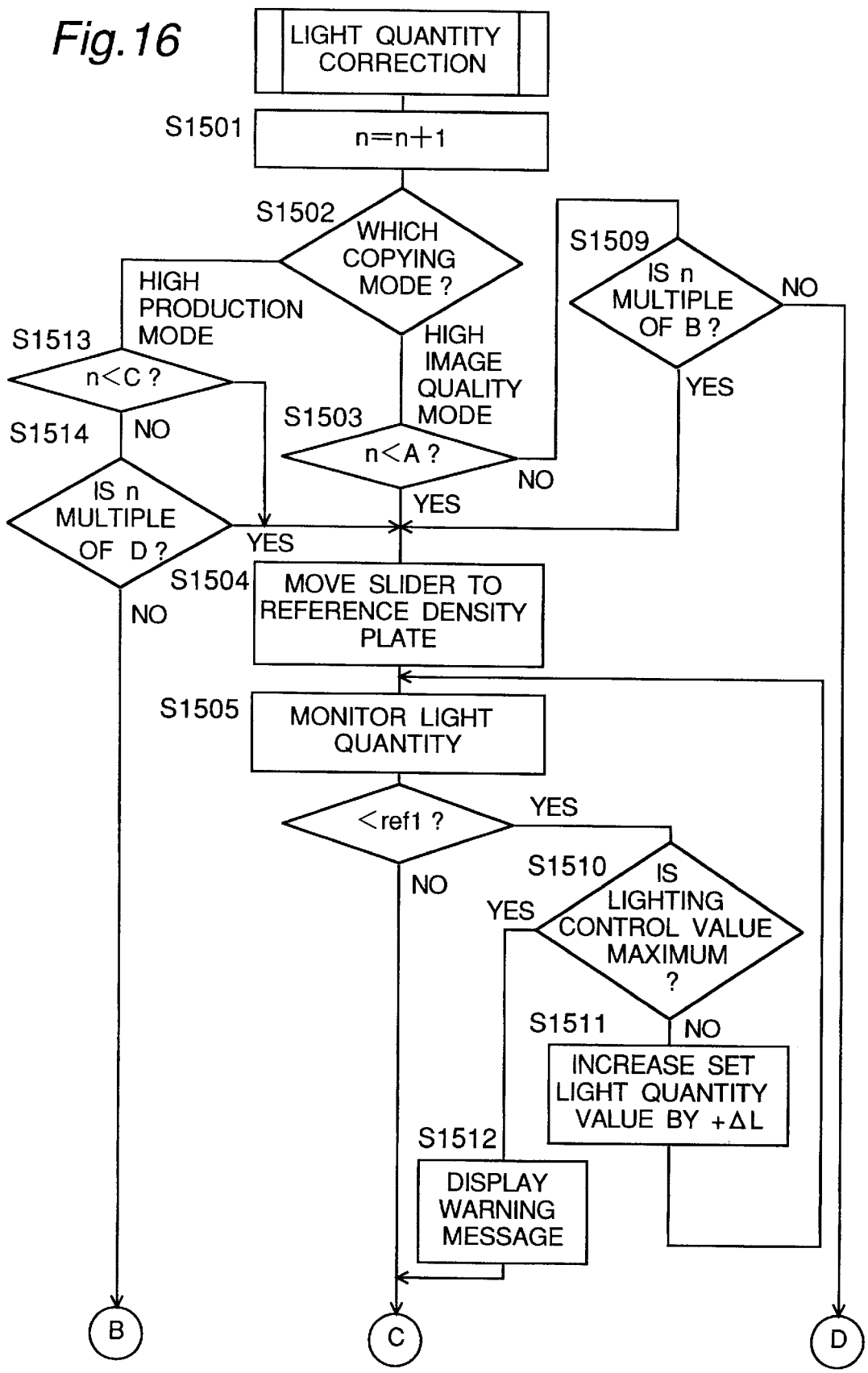
FIGS. 16 and 17 are flowcharts for explaining a light quantity correcting operation in the main routine.
Figure 17:
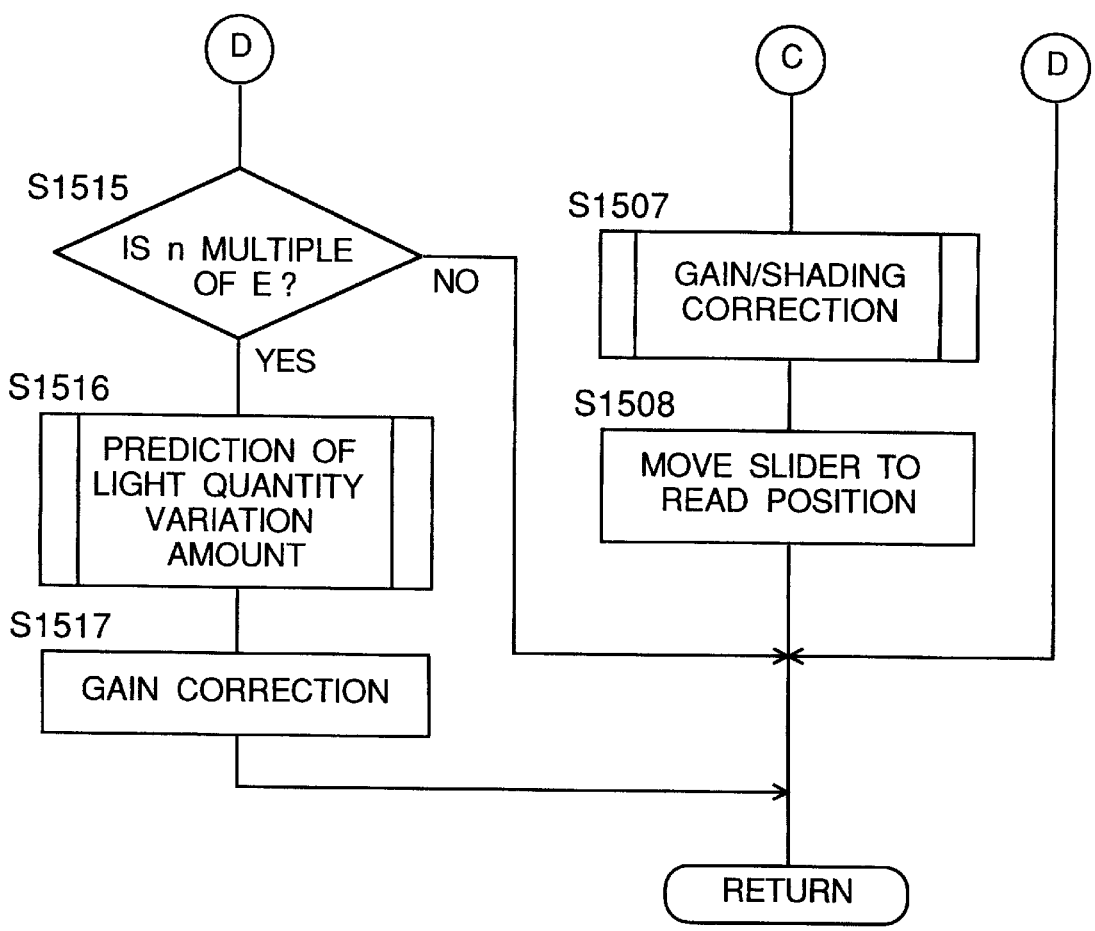

The light quantity correction operation (S1013) in the main routine shown in FIG. 11 will be described next with reference to FIG. 16 and FIG. 17.

First, the number "n" of document sheets is incremented for the next document read operation (S1501). Then, a predetermined processing corresponding to a copying mode set on the operation panel OP is executed (S1502). If the copying mode set is determined to be the high image quality mode in step S1502, the program proceeds to step S1503. In this step, if the number "n" of document sheets is smaller than a preset number "A", it is determined that the fluorescent lamp 215 is starting up. During the startup period, the fluctuation in light quantity of the fluorescent lamp 215 is significant, and therefore, the light quantity correction is executed for each sheet of the document.

Specifically, the slider 20 is moved to the position in which the reference density plate 41 is read (S1504), and the quantity of light of the fluorescent lamp 215 is monitored (S1505).

Then, it is discriminated whether or not the monitored quantity of light of the fluorescent lamp 215 is lower than a minimum image guarantee level "ref1" (S1506). If the light quantity of the fluorescent lamp 215 is not lower than the minimum image guarantee level ref1, only the fluctuation in light quantity is corrected by executing the gain/shading correcting operation (S1507). Subsequently, in order to read the document image, the slider 20 is moved to the document image read position (S1508).

On the other hand, if the monitored quantity of light of the fluorescent lamp 215 is lower than the minimum image guarantee level ref1 in step S1506, the quantity of lamp light is first corrected before the gain/shading correction is performed because with the gain/shading correction only, the S/N ratio would reduce so that the read image quality deteriorates. The correction of the quantity of light in addition to the gain/shading correction avoids the image quality deterioration.

Specifically, it is first discriminated whether or not the currently set lighting control value is a maximum value (S1510). If so, it is impossible to increase the light quantity any more. Therefore, a warning message is displayed (S1512), and the gain/shading correction only is executed (S1507).

In this embodiment, the copying operation is continued with the warning message displayed in step S1512. This is done judging that there is merit to the user in doing so, as compared with the case where the copying function is stopped, even if such copying operation is accompanied with some image deterioration. However, if the user prefers stopping of the copying function to the image quality deterioration, it is acceptable to stop the copying operation instead of displaying the warning message.

If in step S1510 the currently set lighting control value is not the maximum value, the set light quantity value is increased by a specified value ΔL (S1511). Then, the program returns to step S1505 to execute the light quantity monitoring (S1505), and the processing is continued.

If in step S1503, the number "n" of document sheets exceeds the preset value "A", it is determined that the startup period of the fluorescent lamp 215 had been ended and a light quantity stabilized period during which the fluctuation in light quantity falls in a specific range has been entered. Therefore, the light quantity correction is executed for every group of several document sheets instead of executing the light quantity correction for every document sheet.

That is, only when the number "n" of document sheets is a multiple of a predetermined value "B", the slider 20 is moved to the reference density plate 41 (S1504) to execute light quantity correction. If the number "n" is not a multiple of the value "B", the light quantity correcting operation ends, and the next document is read.

If it is discriminated in step S1502 that the copying mode set on the operation panel OP is the high production mode, the program proceeds to step S1513 to execute the following processing.

First, if the number "n" of document sheets is fewer than a predetermined number "C" in step S1513, it is determined that the fluorescent lamp 215 is in its startup period. In the startup period, the fluctuation in light quantity is significant, and therefore, the light quantity correction is executed for each sheet of the document. That is, the slider 20 is moved to the position opposite to the reference density plate 41 (S1504), and the light quantity correction is executed. This light quantity correction is the same as that in the aforementioned high image quality mode, and therefore, no description is provided for it.

If the number "n" of document sheets is equal to or larger than the predetermined value "C" in step S1513, the program proceeds to step S1514 to execute the light quantity correction operation for every "D" document sheets where "D" is a specified number.

The predetermined numbers "C" and "D" may have the same values as those of the specified numbers "A" and "B" in the high image quality mode, however, it is preferable to set the number "C" as small as possible to thereby end the light quantity correction for each document sheet as early as possible after the light quantity has been stabilized in the initial stage of the startup of the fluorescent lamp 215, and, on the other hand, set the number "D" as large as possible to thereby prolong the interval of the subsequent intermittent correction as much as possible to ensure the productivity in the high production mode. However, if the number "D" is too large, the fluctuation in light quantity will disadvantageously increase accordingly so that the fluctuation in image quality is also increased. Therefore, care should be taken in setting the value of "D."

In the high production mode, if the number of document sheets is not "D" in step S1514, the program flow proceeds to step S1515. Then, if the number of document sheets is a multiple of "E" in step S1515, the program proceeds to step S1516 to predict an amount of light quantity variation and execute gain correction only (S1517). Thus, the gain correction is executed every time the number of document sheets becomes a multiple of "E", and in the interval between light quantity correction operations executed every time the number of document sheets becomes a multiple of "D".

By the gain correction, the actual light quantity which varies during the time from immediately after a light quantity correction to a next light quantity correction can be compensated, so that a high image quality is maintained without frequently executing the light quantity correction operation. Therefore, the high production is compatible with the high image quality.

The gain correction is based on the prediction of the amount of light quantity variation. This prediction is executed by calculating a rate of change in light quantity from the last two monitored light quantity values and then predicting a light quantity in the next document reading time. This light quantity prediction is based on the assumption that the rate of change in light quantity is constant. Therefore, a prediction error is included, yet the fluctuation in image quality is suppressed and the image quality is improved accordingly, as compared with the case where no gain correction based on the light quantity prediction is executed.

In the above description, the light quantity correcting timing is controlled by the number of document sheets copied. Alternatively, the lighting time of the fluorescent lamp 215 may be measured to set the light quantity correcting timing based on the measured time. In the case of setting the light quantity correcting timing by the number of document sheets copied, it is preferable to change the number of document sheets for the setting of the light quantity correcting timing according to the document sheet size so that the light quantity correcting timing is determined and set according to the actual light source lighting time.

Figure 18A:
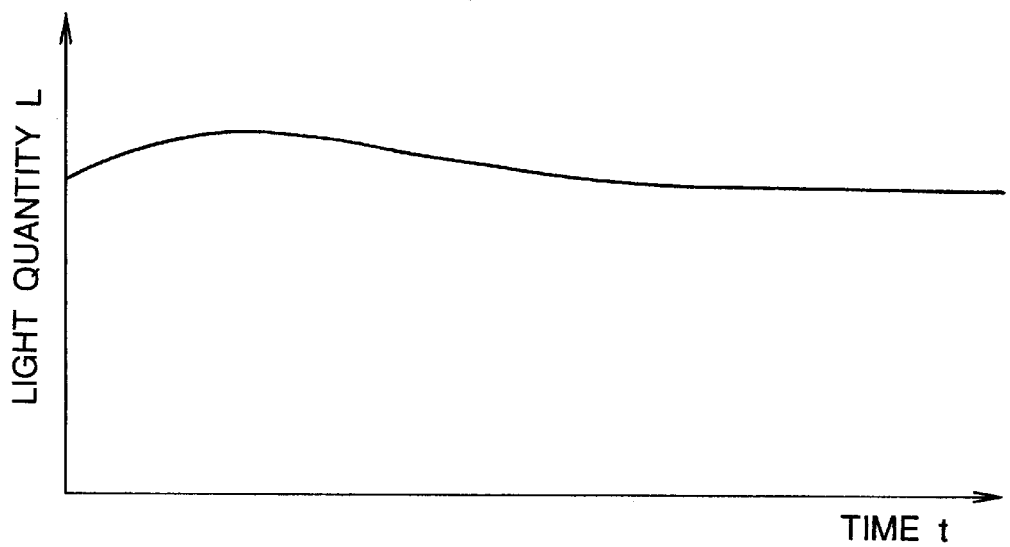
FIG. 18A shows a light quantity rise characteristic of the fluorescent lamp after an instantaneous discontinuation.
Figure 18B:
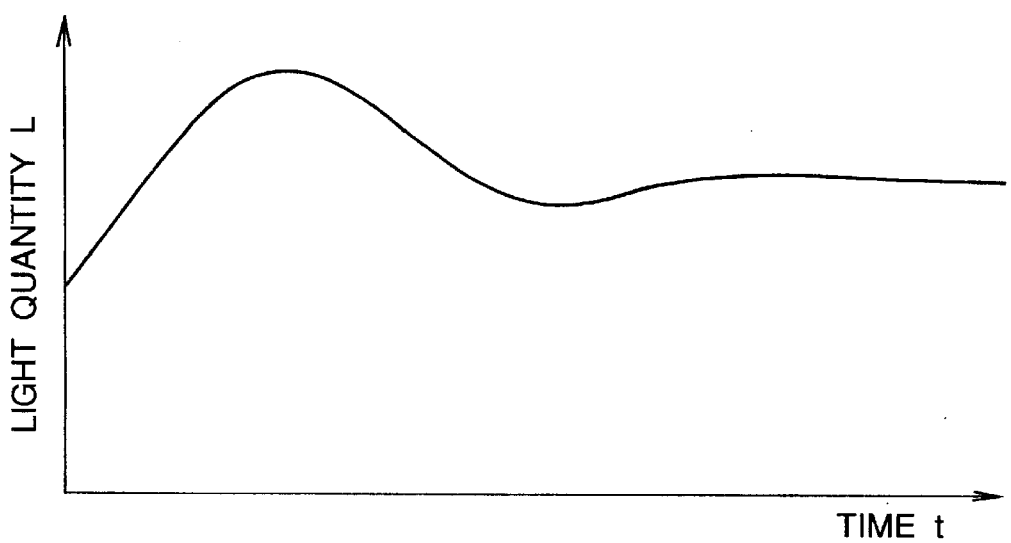
FIG. 18B shows a light quantity rise characteristic of the fluorescent lamp at cold start.

Next, FIGS. 18A and 18B show startup characteristics of the fluorescent lamp immediately after turned on. FIG. 18A shows a startup characteristic of the fluorescent lamp 215 in the case that it is turned on after a lapse of a specified time from when the main switch has been turned on. After a lapse of the specified time, the tube wall temperature of the fluorescent lamp 215 is kept at a certain level, and the light quantity immediately after the turning-on of the lamp is approximately equal to the light quantity during the continuous operation. That is, similar to the instantaneous discontinuation type 3 shown in FIG. 3, the tube wall temperature of the fluorescent lamp 215 has reached the specified level. Therefore, the light quantity variation after the turning-on is little, and a stable light quantity is provided. On the other hand, FIG. 18B shows a startup characteristic in the case where the main switch is turned on in a state in which about ten minutes has passed since the turning-off of the main switch so that the tube wall temperature of the fluorescent lamp 215 has been substantially decreased. The characteristic shown in FIG. 18B represents, for example, a light quantity rising characteristic when the main switch is first turned on in the morning. At the time immediately after turning on this switch, the fluorescent lamp 215 is sufficiently cooled, and the tube wall temperature is substantially equal to an environmental temperature around the copying machine. When the fluorescent lamp 215 is turned on in this sufficiently cooled state, the tube wall temperature rises with time from immediately after the turning-on, and the light quantity varies according to the relationship between an ambient (tube wall) temperature and the light quantity shown in FIG. 4. Then, the light quantity becomes stable after a lapse of a time. However, if the lamp is continuously lit for a long time, the tube wall temperature further rises and the light quantity reduces.

Figure 19A:
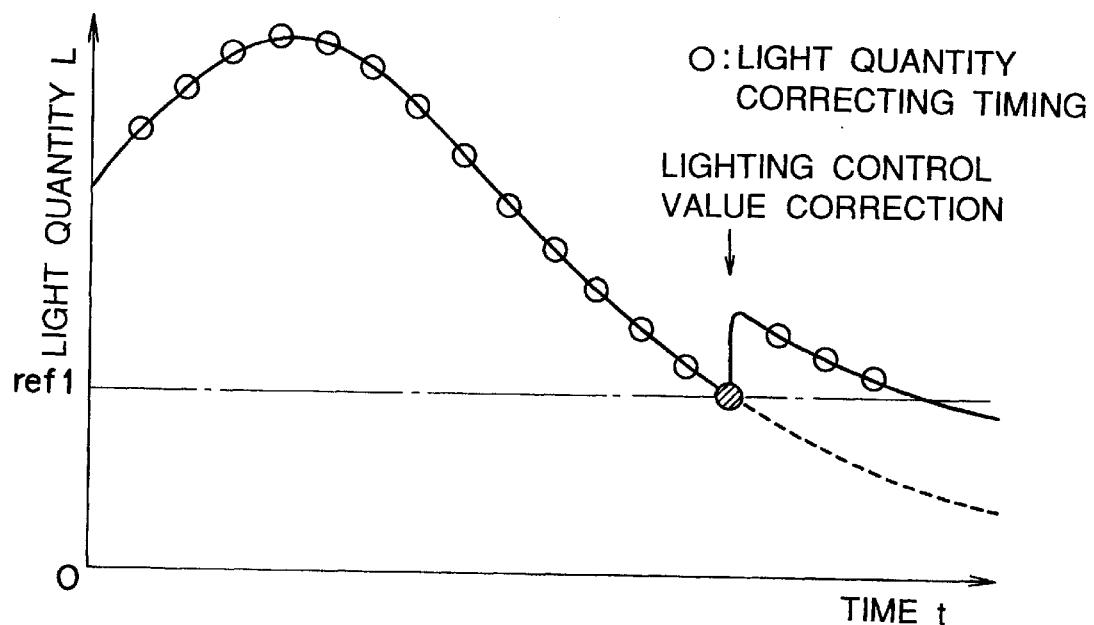
FIG. 19A is a light quantity variation characteristic diagram showing a light quantity correcting timing in a high image quality mode.
Figure 19B:
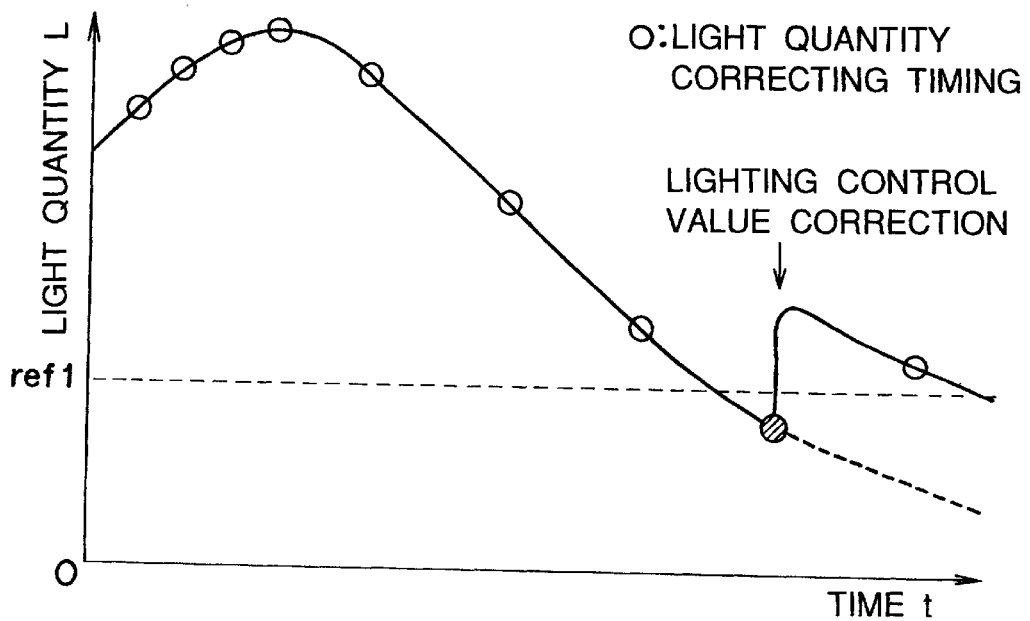
FIG. 19B is a light quantity variation characteristic diagram showing a light quantity correcting timing in a high production mode.

Next, FIGS. 19A and 19B show light quantity correcting timing changeover patterns corresponding to the image quality modes. In these figures, the horizontal axis represents the time t, the vertical axis represents the light quantity L, and the light quantity correcting operation shown in FIG. 16 and FIG. 17 is indicated on a time basis. FIG. 19A shows the light quantity correcting timing for the high image quality mode and the timing is indicated by white circles. The gain/shading correction is executed with the timing indicated by the white circles.

As stated before, the high image quality mode is a mode in which the factors of causing image deterioration are eliminated as much as possible by transferring the image data directly to the printer section 2 not by way of the memory 214 or taking a similar measure, attaching greater importance to the image quality. Therefore, the high image quality mode must avoid the fluctuation in density or the like of the image due to the light quantity variation of the light source. Therefore, in the high image quality mode, as indicated by the white circles in FIG. 19A, the light quantity correction (gain/shading correction) is executed more frequently than in the high production mode. If the light quantity does not reach the minimum image guarantee level ref1, the lighting control value (output of the lighting control inverter 216) is reset with the timing indicated by a black circle to increase light quantity. After the lighting control value is reset, a specified increase in light quantity is effected. Thereafter, it will take a certain time for the light quantity to decrease again to the minimum image guarantee level ref1.

On the other hand, in FIG. 19B, the light quantity correcting timing in the high production mode is indicated by the white circles. In the high production mode, the read image is once stored into the memory 214 and thereafter the image data is transferred to the printer section 2. Because the image data are stored in the memory 214, the image data is subjected to data compression and decompression processing during which loss of image information may occur, which in turn reduces the image quality. However, on the other hand, by editing and processing the image data stored in the memory 214, the productivity during copying is improved. In order to make the best use of the merits of the high production mode, the frequency of light quantity correcting operation requiring a specified time must be reduced as much as possible.

Therefore, in the high production mode, as shown in FIG. 19B, the light quantity correction is executed as frequently as in the high image quality mode until a peak light quantity in the initial stage appears, and thereafter the light quantity correction is executed in a longer cycle than in the high image quality mode.

Furthermore, in the high production mode, if the light quantity does not reach the minimum image guarantee level ref1, the lighting control value is reset with the timing indicated by a black circle to increase light quantity as in the high image quality mode shown in FIG. 19A.

Next, FIG. 20 shows that in the high production mode, the light quantity starts to vary immediately after the light quantity correction is executed (white circle). A distance between a broken line horizontally extending from each white circle and a solid line representing the light quantity represents an amount of deviation in light quantity from the light quantity at the time of correction. FIG. 20 indicates a light quantity correction error occurring when the light quantity correction is executed only with the correcting timing shown in FIG. 19B.

As explained with reference to FIG. 19B, the intervals of light quantity correction in the high production mode are made wider than in the high image quality mode. Therefore, the fluctuation in light quantity between a correction time to the next correction time (between adjacent white circles) becomes wider. Accordingly, there is a large gap between the actual light quantity, indicated by the solid line, and the light quantity recognized by the reading device, indicated by the step-shaped broken lines. This gap, i.e., the amount of deviation in light quantity from each correction time affects the image as a correction error. That is, the difference between the actual light quantity that varies tracing a smooth curve as indicated by the solid line and the recognized light quantity indicated by the broken lines becomes a light quantity correction error to fluctuate the image quality.

In order to reduce the light quantity correction error, the light quantity correction should be executed more frequently, which, however, will result in a considerable reduction in productivity, as stated before.

Figure 21:
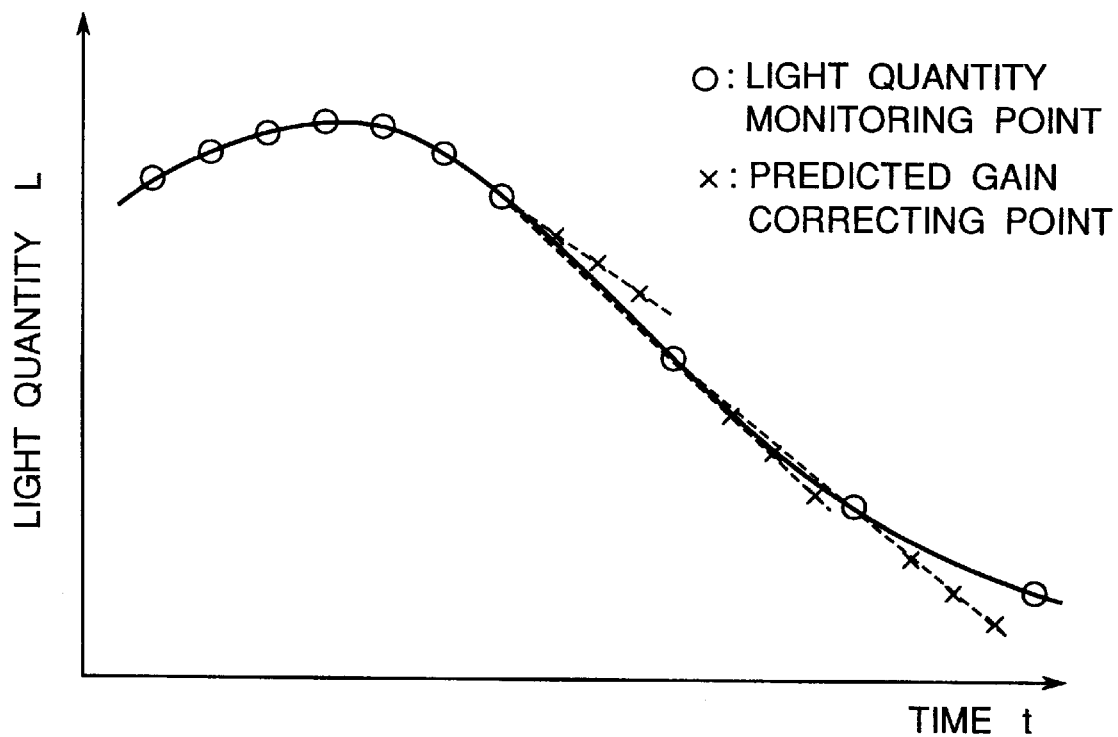
FIG. 21 is a characteristic diagram for explaining an intermediate gain correcting operation based on a light quantity prediction in the high production mode.

Therefore, as shown in FIG. 21, the fluctuation in light quantity is predicted from the light quantity detected at the preceding light quantity correcting point (indicated by the white circle), and the light quantity correction is executed at specified time intervals (at the time corresponding to each X-shaped mark) based on the predicted light quantity without actually detecting the light quantity. By this operation, the light quantity can be corrected without consuming time required for the light quantity measurement at the time of each X-shaped mark. Therefore, the image quality can be improved without sacrificing the productivity, thereby allowing the high productivity to be compatible with a good image quality.

In more detail, according to the aforementioned light quantity prediction, the gain correction is executed at the time of each X-shaped mark by predicting the next light quantity from light quantities measured at the preceding two white circles on the assumption that the light quantity varies linearly at an identical rate of change, as indicated by the broken lines in FIG. 21. By this operation, the light quantity is corrected without actually executing the light quantity measurement accompanied by the sliding operation of the slider 20. Therefore, the correction is performed while the document is being conveyed. As a result, a high-productivity function is achieved while suppressing the reduction in image quality.

Figure 22:
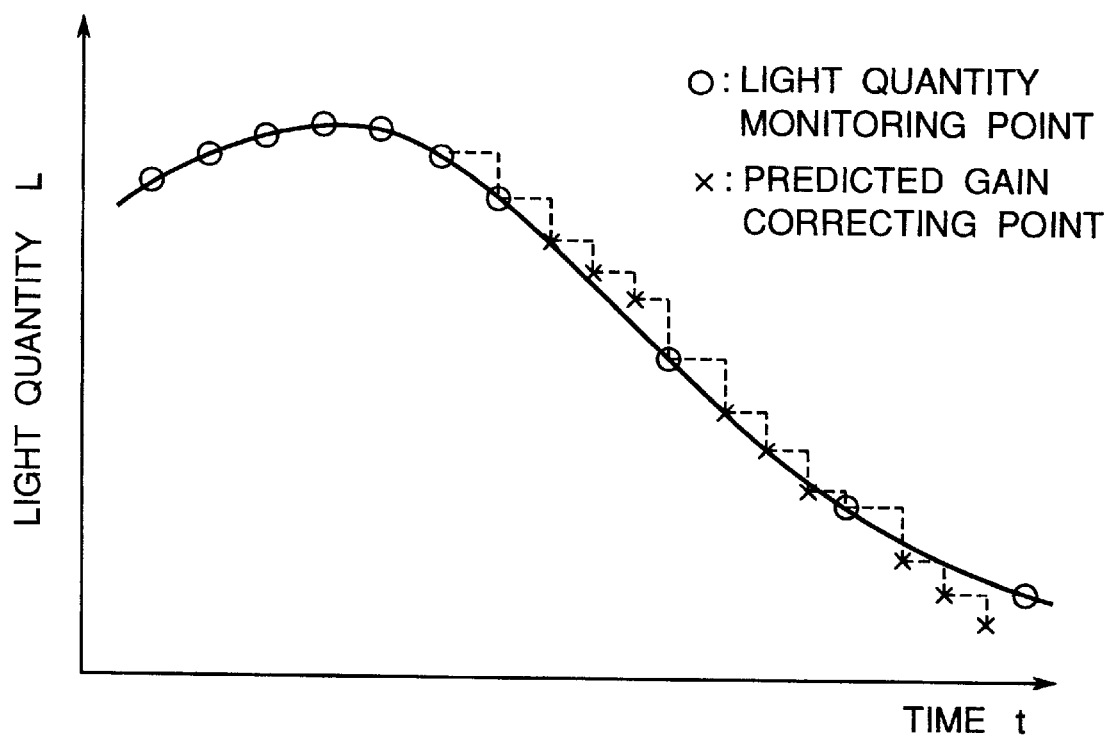
FIG. 22 is a characteristic diagram for explaining a correction deviation when the intermediate gain correcting operation is executed in the high production mode.

FIG. 22 shows a light quantity correction error in the case where the gain correction is executed through the light quantity prediction as shown in FIG. 21, where the error is indicated by the deviation of the solid line (actual light quantity) from the broken line (recognized light quantity). The reading device holds a light quantity monitored at a light quantity correction point (indicated by a white circle) until the next light quantity monitoring point (indicated by a white circle). Therefore, the device recognizes the light quantity in the stepped form as indicated by the broken lines in the figure. However, since the gain correction (X-shaped mark) by the prediction is executed between the light quantity correcting points (i.e., between adjacent white circles), the recognized light quantity (indicated by the broken lines) can be placed fairly closer to the actual light quantity (indicated by the solid line). This arrangement enables achievement of a copying mode which suppresses the reduction in image quality to the minimum while ensuring a high productivity.

Second Embodiment

Figure 23:
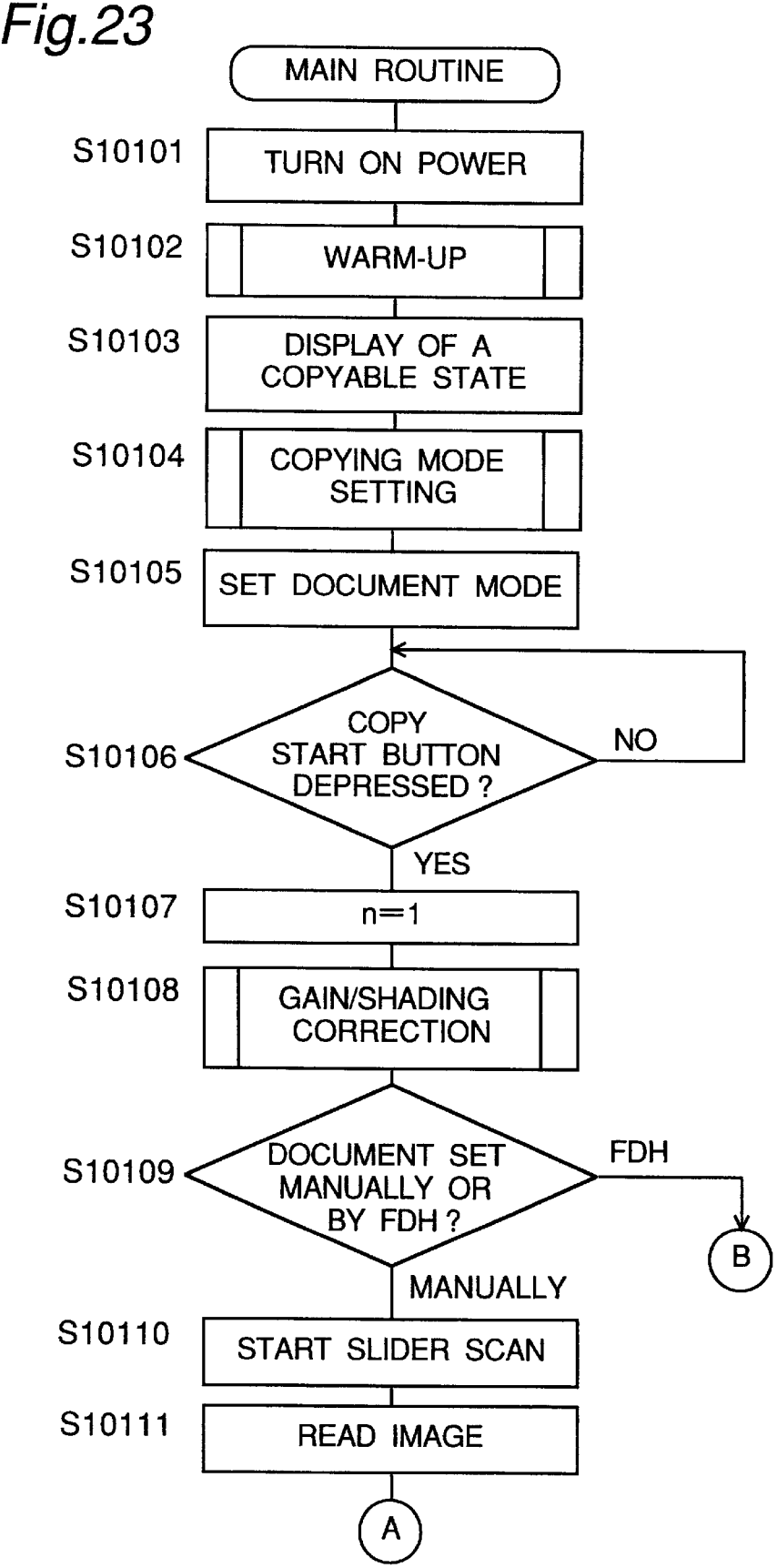
FIGS. 23 and 24 are flowcharts of a main routine of the operation in a second embodiment of the invention.
Figure 24:
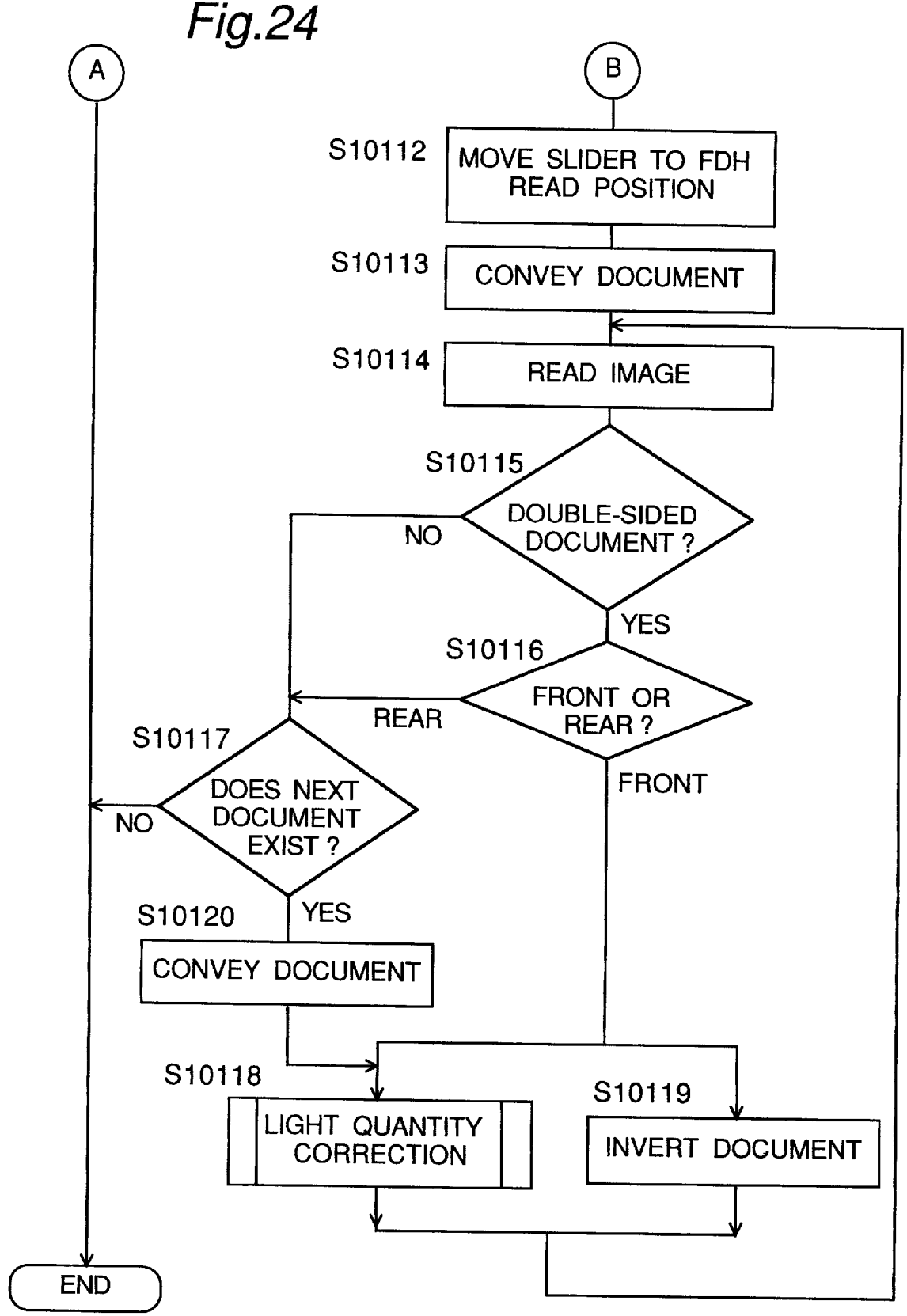

The operation sequence of the image reading device of another embodiment will be described next with reference to FIG. 23 and FIG. 24.

First, a main switch is turned on, by which the power is turned on (S10101). Then, a warm-up is started to increase the tube wall temperature of the fluorescent lamp so that the light quantity of the fluorescent lamp becomes stable (S10102). After the warm-up is completed, a copyable state is displayed to inform the user of the fact that the copying can be performed (S10103).

Then, after the copying mode setting (S10104) and document mode setting (S10105) are executed, the system waits for the depression of the copy start button (S10106). With the copy button depressed, the number "n" of the document sheets or pages is incremented to "1" (S10107), the gain adjustment is executed for correcting the variation in light quantity of the fluorescent lamp and the variation in gain of the circuit. Further, in order to reduce the light distribution nonuniformity of the fluorescent lamp 215 and image noises in the main scanning direction due to the variation in sensitivity between the CCD pixels, a gain/shading correction is executed (S10108).

Then, it is discriminated whether the document 202 has been placed manually or automatically set by means of the automatic document feeder FDH. If the document has been placed manually, scan of the slider 20 is started (S10110) and the image of the document 202 is read (S10111).

If the document 202 has been set in the automatic document feeder FDH, the slider 20 is moved to a document read position (S10112), the document starts to be conveyed (S10113), and the document image is read (S10114).

Then, it is discriminated whether the document mode set at this time is a double-sided mode or a single-sided mode (S10115). If the document is a double-sided document, then it is discriminated whether a currently read image belongs to a front surface or a rear surface of the document sheet (S10116). In the case of the front surface, a document inverting operation is executed (S10119) and the light quantity correcting operation is concurrently executed (S10118). With the inversion of the document and the light quantity correction completed, an image of the rear surface is read (S10114).

If the set document mode is the single-sided mode or if the rear surface has been read in the double-sided mode, it is discriminated after the image reading operation whether or not a next document sheet exists (S10117). If the next document sheet exists, it is conveyed (S10120), and then the light quantity correction is executed (S10118). Thereafter, the program flow returns to step S10114 to execute processing similar to the above.

When the next document sheet does not exist in step S10117, the read sequence immediately ends.

Figure 25:
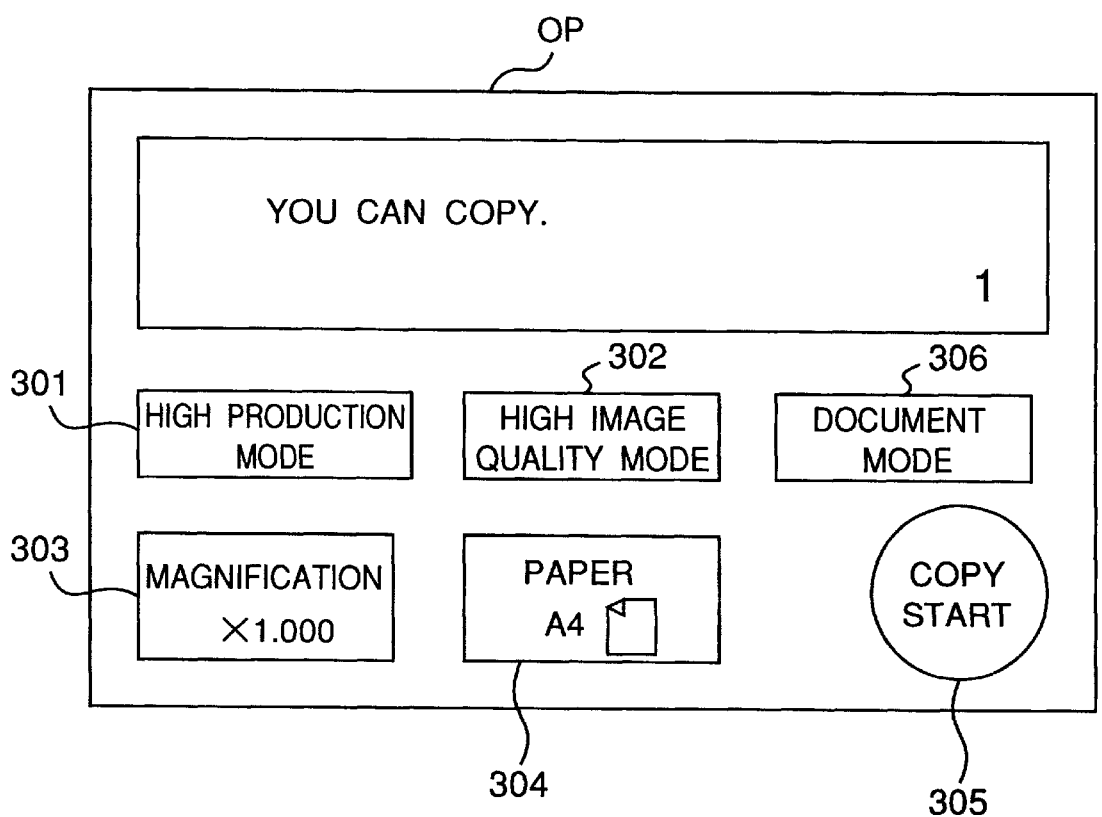
FIG. 25 is a top view of an operation panel of the second embodiment.

FIG. 25 shows an operation panel OP for executing the setting of a copying mode and the selection of a magnification, and paper type. This operation panel OP includes a high production mode button 301, a high image quality mode button 302, a button 303 for setting a magnification, a button 304 for selecting the paper type, and a button 306 for selecting document mode.

First, the document 202 is set on the document table 10, and the operation panel OP is operated to set the copying magnification, a button 304 for selecting the paper type and a button 306 for selecting document mode. Then, a copy quantity is set by a ten-key pad (not shown), and a copy start button 305 is depressed when the preparation for the copying is completed. Then, the main routine shown in FIGS. 23 and 24 starts to execute a specified operation to copy the document image.

When the high image quality mode key 302 or the high production mode key 301, which are the copying mode selecting keys, is depressed, the copying mode is set to the mode of the depressed key according to the copying mode setting flow shown in FIG. 13.

Figure 26:
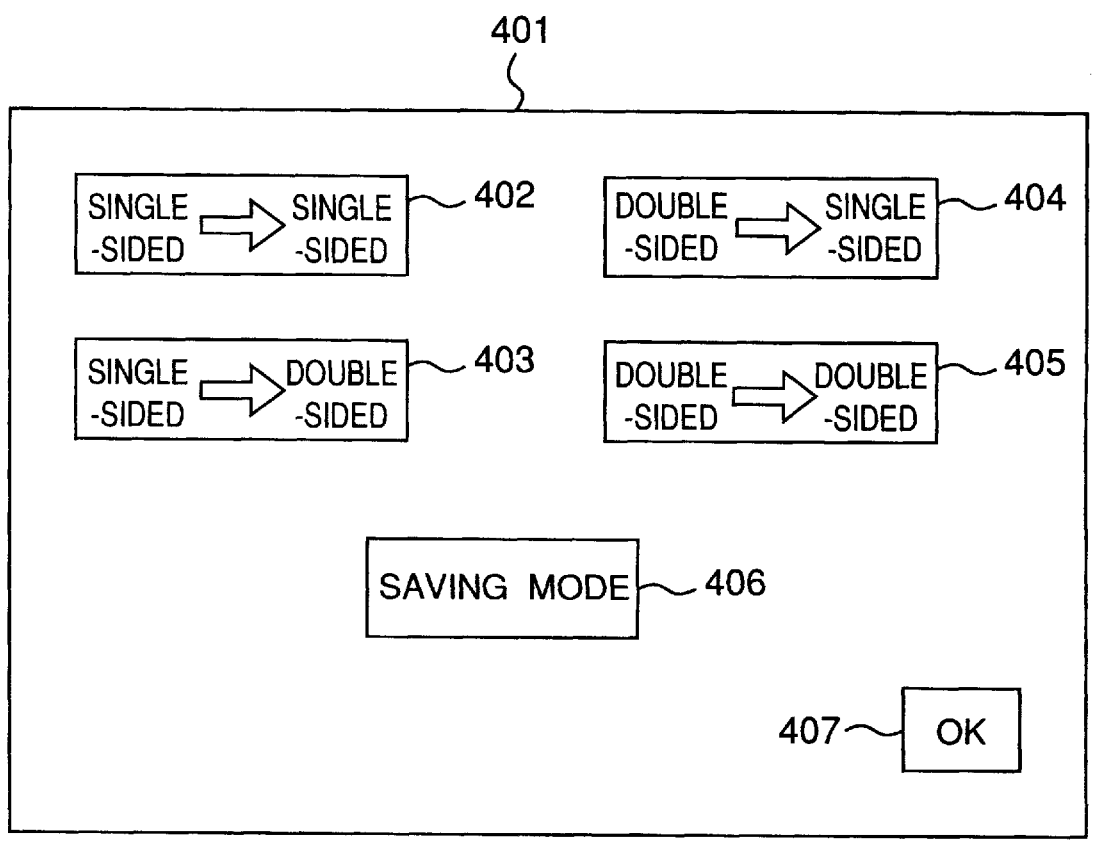
FIG. 26 is a diagram showing a document mode setting screen of the operation panel of the second embodiment.

When a document mode setting button 306 is depressed, the operation panel OP is switched to a document mode setting screen 401, shown in FIG. 26, thereby allowing various document mode settings. With a display item 402 or a display item 403 on the screen 401 depressed, the machine is set to a document mode in which one surface of a set document sheet is copied. With a display item 404 or a display item 405 depressed, the machine is set to a document mode in which both the surfaces of a set document sheet are copied. Further, with the display item 402 or 404 depressed, the machine is set to a mode in which the document is copied on one surface of the copying paper sheet. With the display item 403 or 405, the machine is set to a mode in which the document is copied on both surfaces of the copying paper sheet.

When the above document mode setting is completed, the operation panel OP returns to the initial screen shown in FIG. 25 in response to depression of an OK button 407. On the other hand, if a saving mode button 406 is operated, the operation panel changes to another screen to allow the setting of a mode in which the copy quantity is saved, such as a two-in-one mode or a four-in-one mode (where the images of four document sheets are copied onto one paper sheet).

Third Embodiment

The brightness of the fluorescent lamp 215 reduces as the lighting time elapses. Major factors of the reduction in brightness are: deterioration and coloring of the fluorescent substance due to impurity gas remaining in the tube during production of the lamp, deterioration of the fluorescent substance due to ultraviolet rays, and coloring of the glass tube due to ultraviolet rays. In general, the reduction in brightness of the fluorescent lamp 215 is great in the initial stage, and the subsequent reduction becomes gradually less.

Figure 27:
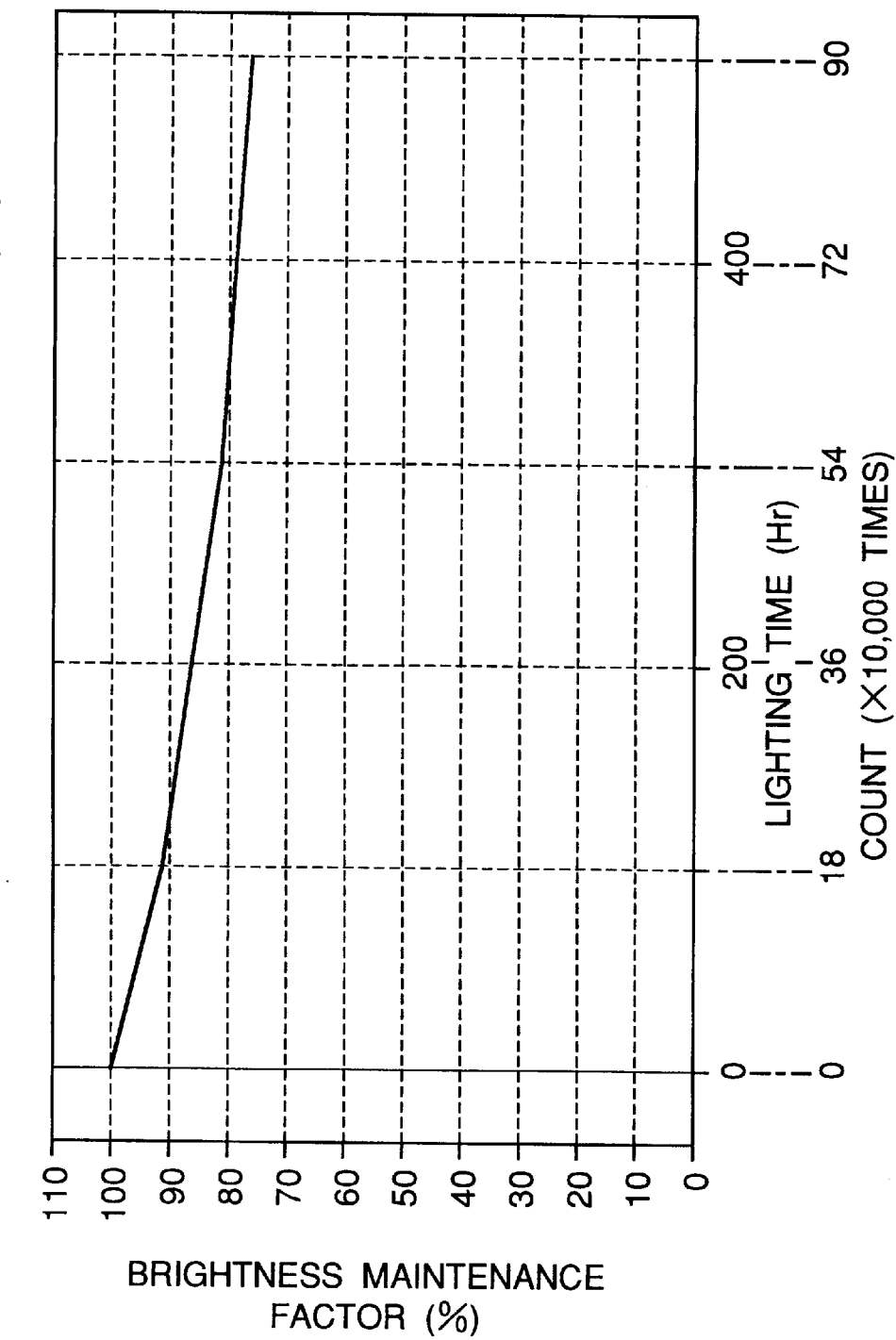
FIG. 27 shows a characteristic of deterioration with time of a fluorescent lamp with respect to 100% of a light quantity of the lamp in a new-product state.

The deterioration with time characteristic of the fluorescent lamp 215 is shown in FIG. 27. In FIG. 27, the horizontal axis represents a cumulative lighting time, while the vertical axis represents a ratio of maintaining the brightness relative to 100% of the brightness in the new product state. A count, or a value of a counter is indicated below the horizontally axis representing the cumulative lighting time. The count is a sum of the number of times of reading document sheets manually placed and the number of times of feeding document sheets by means of the automatic document feeder FDH. The number of times of reading is a number counted by a counter which is preparatorily provided for managing the durability of a scan motor. The number of times of feeding is a number counted by another counter which is preparatorily provided for managing the durability of a document conveyor motor. Therefore, no new special counter is required in obtaining the above count, so that a cost increase is avoided.

The cumulative lighting time is defined as a value obtained by using the above count as a total document read number, and multiplying the total document read number by a time (two seconds, for example) required for reading an A3-size document at 1× magnification. In actual operations, there is a variation in document, paper size and magnification, and the read time per read operation varies among the case of a one-sided copy, the case of two-sided copy, the case where different types of documents are mixed, and the case where the document size is detected. In this embodiment, the lighting time is estimated, using the A3-size document read time as a reference, to be longer than in the actual case where A4-size documents are mostly read, so that the light quantity correction is performed earlier.

In this embodiment, the light quantity correction is executed every time the brightness maintenance ratio reduces by 5% in FIG. 27. Therefore, the light quantity correction is executed after the count exceeds 90,000, 210, 000, 390,000, 600,000 and 900,000. Data representing the light quantity correcting timing are preparatorily stored in the ROM 220 connected to the CPU 28 shown in FIG. 2.

Next, an initial operation at the time of turning on the power in this embodiment will be described with reference to the flowchart of FIG. 28. The initial operation at the time of turning on the power includes an operation equivalent to that of turning on the power for trouble reset.

First, when the power is turned on, the program flow proceeds to step Si to start the timer. Next, the slider 20 shown in FIG. 1 is moved to a reference position. Then, the slider 20 is moved to a position opposite to the reference density plate 41. Next, the offset adjustment is executed.

Next, the program flow proceeds to step S2 to determine whether or not it is time to correct the light quantity. More specifically, it is discriminated whether or not the counter has exceeded any of the values (90,000, 210,000, 390,000, 600,000 or 900,000) stored in the ROM 220. If it is determined that now is the time to correct the light quantity, the program flow proceeds to step S3. If it is determined that now is not the time to correct the light quantity, the program flow proceeds to step S6 to turn off the fluorescent lamp 215.

In step S3 the fluorescent lamp 215 is turned on and the program flow proceeds to step S4 at which a peak light quantity is detected. Then in step S5 a lighting m control value is determined and the lighting control value is written as backup data into a memory 46 and the program flow proceeds to step S6. The steps S4 and S5 provides a first light quantity adjustment (concurrently providing warm-up and lighting control irregularity removal as well).

In step S6, the lamp is turned off, the timer is stopped and the slider is moved to the specified reference position, thereby completing the startup operations.

As described above, according to this embodiment, the light quantity correcting timing is based on the event that the document read number exceeds 90,000, 210,000, 390,000, 600,000 or 900,000. That is, the light quantity correcting timing is set in accordance with the deterioration of the fluorescent lamp 215 with time. With this arrangement, the reduction in brightness of the fluorescent lamp 215 due to the deterioration with age is compensated while suppressing the correction frequency, thereby allowing the productivity and the image quality to be compatible. Although the light quantity correcting timing is determined based on the document read number in the present embodiment, the light quantity correcting timing may be determined on the basis of the lighting time of the fluorescent lamp 215. When determining the light quantity correcting timing based on the document read number as in this embodiment, however, the existing counters can be utilized as described above, so that the cost increase is prevented.

In this embodiment, control of the power for the temperature controlling heater 217 of the fluorescent lamp 215 is performed by the printer section 2 similar to the heater of a fixing section, so that temperature control information is received from a CPU owned by the printer section 2. The reason for the above is to turn off the power of the image reading section IR in the energy saving mode in which the standby time can be set by the user, thereby suppressing the consumption power to the minimum and yet allowing reading to be immediately started upon fixation by the printer section 2 at the time of return.

In controlling the lighting of the fluorescent lamp 215, after a lapse of an appropriate pre-heating time of the fluorescent lamp 215, the lamp is once lit with a lighting control value of 100% regardless of a desired lighting control value, and then the lighting control value is controlled to the desired value after a lapse of a specified time. The reason for this is to prolong the life of the fluorescent lamp 215 and prevent the lamp from not being lit at a low temperature and a low lighting control value.

When executing the light quantity adjustment, conditions, such as the ambient temperature and the time during which the fluorescent lamp 215 is off, are not known. Therefore, the light quantity variation curve (see FIG. 3) is estimated according to the following method and the lighting control value is determined. The estimation of the light quantity variation curve may be based on a relative light quantity value, although it is necessary to know an absolute light quantity in order to determine an optimum lighting control value such that the CCD output is not saturated. When attaching importance to the image quality, it is necessary to know a minimum required light quantity as well as preventing saturation. The minimum required light quantity may be varied according to the reading mode (character mode, photographic mode, and so on).

The following describes an outline of the first light quantity adjustment executed in steps S4 and S5 shown in FIG. 28, and a detail of which will be described in the next section entitled <Detail of First Light Quantity Adjustment>. In the first light quantity adjustment, the CPU 28 stands by after turning on the lamp based on a light quantity variation pattern that can be beforehand generated based on the lighting control value, and thereafter the monitoring of the light quantity variation is started. Then, a peak light quantity and a light quantity variation curve are obtained, and an optimum lighting control value capable of absorbing the fluctuation in light quantity due to the ambient temperature and the fluctuation in light quantity at the time of re-lighting the lamp is estimated and set.

Detail of First Light Quantity Adjustment

The first light quantity adjustment of this embodiment will be described with reference to the flowcharts of FIG. 29 and FIG. 30.

0. First, various initial values are set using read data of the reference density plate 41 such that the absolute light quantity of the fluorescent lamp 215 is measured. Specifically, the slider 20 is moved to the reference density plate 41, and variables (a maximum value, the number of continuous occurrence of each light quantity variation tendency, and so on) for use in the operations are initialized. Then, the fluorescent lamp 215 is turned on, and a timer is started (steps S11 and S12).

1. Next, referring to the value of the timer, the CPU waits for a specified time, for example, one minute and 15 seconds, to detect a peak light quantity (step S13).

2. Next, data at a specified point is sampled every second after turning on the fluorescent lamp 215. The above data represent the light quantity of the fluorescent lamp 215 read by the CCD 204 from the reference density plate 41. The above specified point is a point representing a predetermined main scanning direction light distribution peak when the light quantity is stable. The sampling of the above data is executed not at one point but with an average value of a plurality of pixels, thereby increasing the data accuracy. Among the initial data, only one of data of an ODD output system of the CCD 204 or data of an EVEN output system thereof that is larger in value than the other is adopted as data for the subsequent processing, thereby simplifying the data processing (step S14).

3. Next, a maximum value of the data is detected and stored in the memory 46 (peak hold). On the other hand, the light quantity is sampled every second, thereby obtaining an amount of light quantity variation (difference and vector) in a period of five seconds (step S15).

Specifically, the sampling is executed in the order of (1) (data at the zero-th second), (2) (data at the first second), . . . (6) (data at the fifth second), and the light quantity variation is obtained from (6) minus (1).

4. Next, the light quantity variation tendency is determined from the amount of light quantity variation obtained above (step S15). In concrete, the light quantity variation amount [(6)–(1)] is compared with a tolerance "a" in determining the variation tendency as follows.

If $|(6)-(1)| \leq a$, it is determined that the light quantity is stabilized (not varied).

If $(6)-(1)>a$, it is determined that the light quantity is increasing.

If $(6)-(1)<-a$, it is determined that the light quantity is decreasing.

It is to be noted that the above tolerance "a" is not a fixed value, and it is changed according to the absolute value of the data (light quantity). The reason for that is that variations in absolute value of the output data due to variations of the components are wide and that there are also variations of data attributed to the circuit system. Therefore, if the tolerance "a" is a fixed value, the tendency of the light quantity variation cannot be correctly determined.

5. Next, in step S16, detection of the light quantity peak is executed on the basis of the continuity of the light quantity variation tendency. If it is determined that the light quantity peak has been detected, the following Processes 1 through 3 are executed for the determination of the light quantity variation curve.

[Process 1] (step S17)

In this Process 1, it is discriminated whether or not the light quantity variation curve is the light quantity variation curve 3 shown in FIG. 3. That is, either if the number of consecutive occurrence of increase in light quantity is 5 or larger or if the number of consecutive occurrence of decrease in light quantity or the number of consecutive occurrence of stability of light quantity is 5 or larger after a lapse of the light quantity peak detection wait time, it is determined that the light quantity variation curve is other than of the instantaneous discontinuation type.

Figure 28:
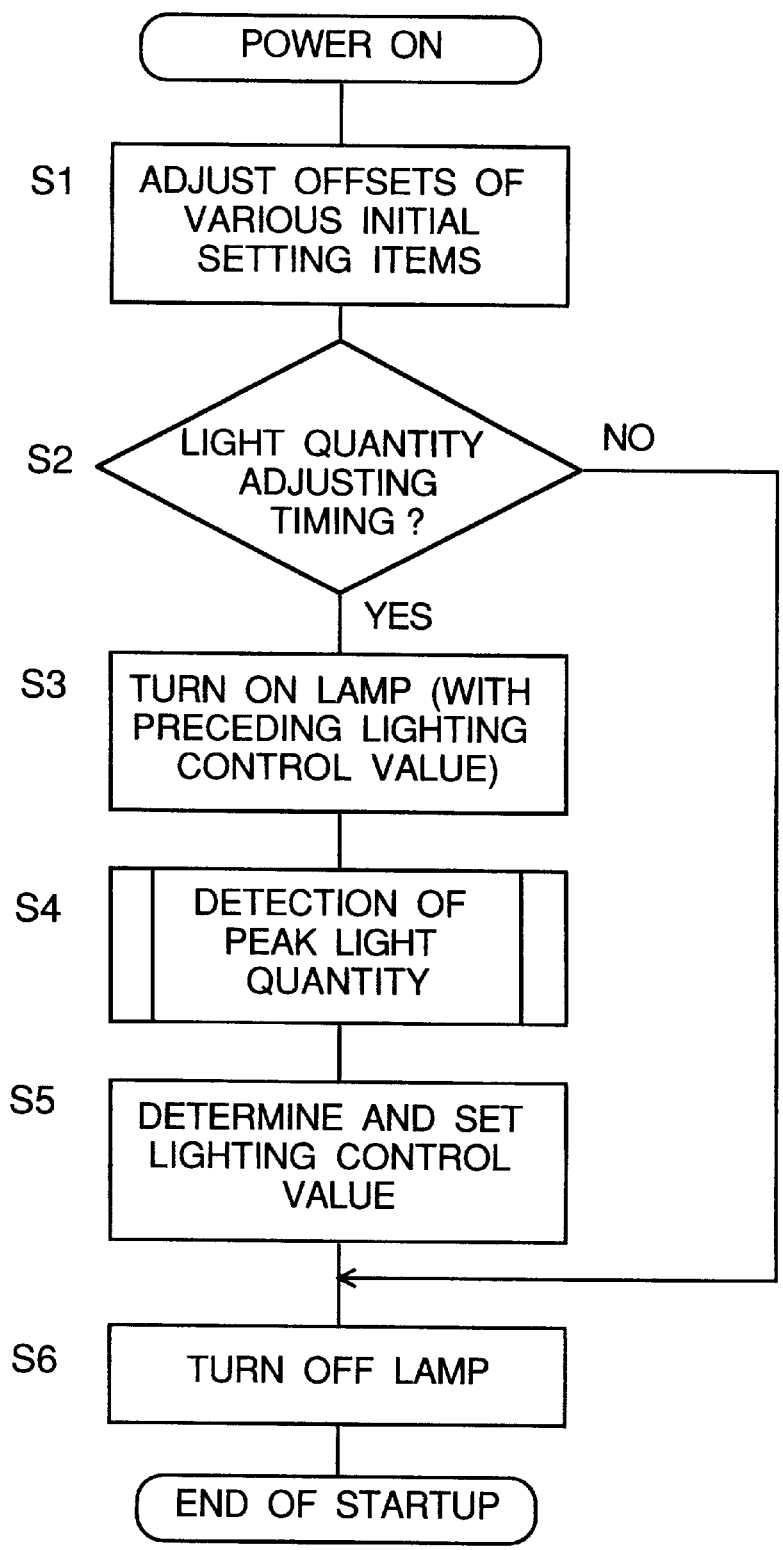
FIG. 28 is a flowchart for explaining a startup operation of a third embodiment.

Then, if it is determined in step S17 that the light quantity variation curve is the instantaneous discontinuation type, the timer is stopped (S22) and the program flow proceeds to the lighting control value determining process (step S5) of the flowchart shown in FIG. 28. When it is determined that the light quantity variation curve is not of the instantaneous discontinuation type in Process 1, the following Process 2 is executed.

[Process 2] (steps S18, S19, S20)

In this Process 2, it is discriminated whether the type of the light quantity variation curve is the light quantity variation curve 1 or the light quantity variation curve 2 shown in FIG. 3, i.e., whether it is of the standard type or the quasi-standard type. Specifically, if the number of consecutive occurrence of decrease in light quantity is not less than 10, it is determined that the light quantity variation curve is of the standard type.

In the case that it cannot be determined that the light quantity variation curve is of the standard type even after a lapse of 20 seconds from the start of the Process 2, it is determined that the light quantity variation curve is of the quasi-standard type.

If it is determined that the light quantity variation curve is of the standard type in this Process 2, the program flow proceeds to the next Process 3, i.e., the lighting control value determining process (step S21).

[Process 3] (steps S23, S24)

In Process 3, a bottom value of the light quantity variation curve 2 of the quasi-standard type is detected. Specifically, if a light quantity increase or a light quantity stabilization continues for five seconds, a current average light quantity data value is determined as the bottom value.

It is to be noted that the peak light quantity value refers to a maximum value of the data stored so far.

Then, the processes of the aforementioned items 2, 3, 4 and 5 are repeated every sampling of data until the peak of the light quantity variation curve is obtained.

6. Next, an optimum lighting control value to be set is determined from the peak value (or bottom value) of the obtained light quantity variation curve, while a lighting control value for the inverter 216 shown in FIG. 2 is set and stored in a storage (EEPROM). The optimum lighting control value mentioned here refers to a lighting control value which does not allow the light quantity peak to exceed the CCD saturation level in spite of a continuous lighting at the time of read after the lighting control value setting process and variation in environmental conditions.

Specifically, when it is determined that the light quantity variation curve is of the standard type, the optimum lighting control value is obtained from the following equation (1). When it is determined that the light quantity variation curve is of the quasi-standard type, the optimum lighting control value is obtained from the following equation (2). When it is determined that the light quantity variation curve is of the instantaneous discontinuation type, the preceding set value stored in the storage (EEPROM) is used as it is.

Equation (1) for the standard type:

Optimum lighting control value={(target value)×(total gain)/(peak value)×b}×(current lighting control value)

Equation (2) for the quasi-standard type:

Optimum lighting control value={(target value)×(total gain)/(peak value×1.1)×b}×(current lighting control value)

In the above equations (1) and (2), the "target value" is a value which does not cause the CCD output to be saturated when the CCD sensitivity and the analog total gain have standard values. This target value may be a fixed value or varied on the basis of a preparatorily stored CCD saturation output voltage. The "total gain" represents a dispersion from the standard values of the CCD sensitivity and the analog gain. The constant "b" represents a ratio of peak light quantity generated by the lighting control value to light quantity in the stabilized state.

Figure 29:
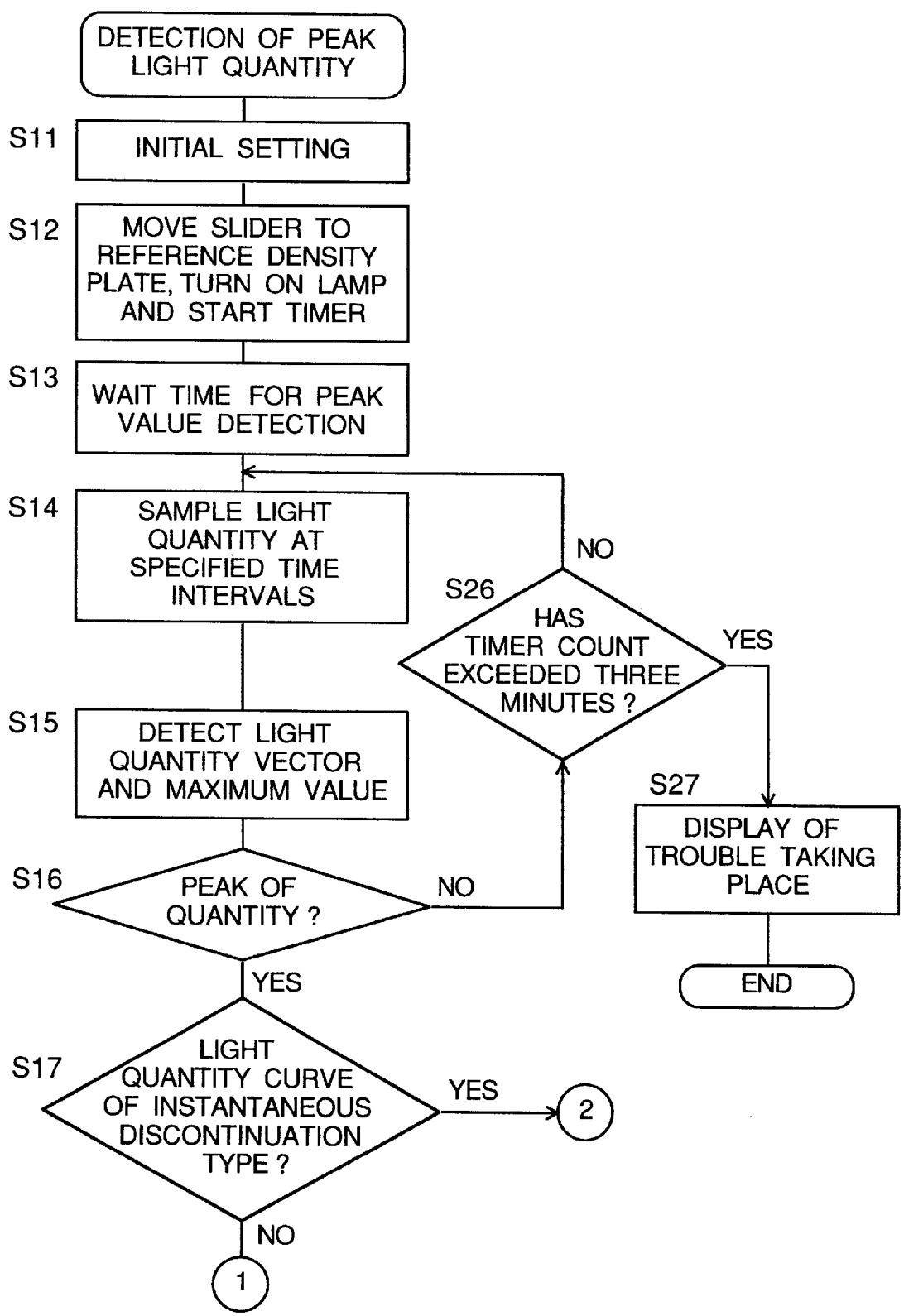
FIGS. 29 and 30 are flowcharts for explaining an operation of detecting a light quantity peak of the fluorescent lamp of the third embodiment.
Figure 30:
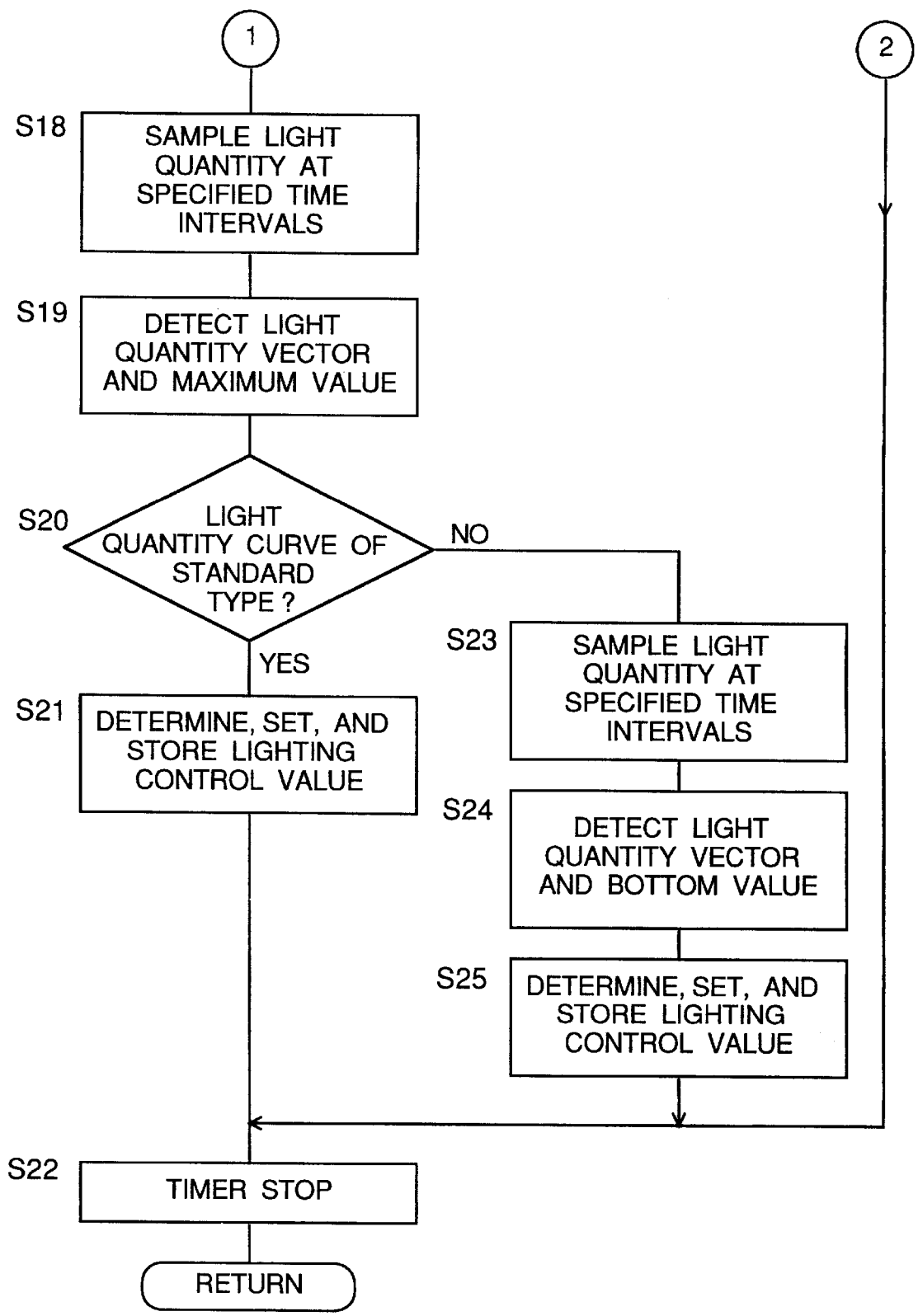

In this embodiment, when it is not determined that the light quantity peak has been detected in step S16 of the flowchart of FIG. 29, the program flow returns to step S14 via the discrimination in step S26 whether or not the time measured by the timer has exceeded three minutes. If it is determined that the measured time has exceeded three minutes, it is judged that a trouble has occurred, and the occurrence of the trouble is displayed on the display panel. Possible troubles are, for example, lamp disconnection, heater disconnection, optical axis displacement, harness abnormality, power abnormality, CCD board failure, digital board failure and so on. The CPU 28 may preparatorily read the information on the "target value", "total gain" and "constant (b)" from the storage (memory 46) when the power turns on and determine various values such as a tolerance "a", a value for the determination of light quantity shortage, and lighting control value calculating formulas. It is advisable to set for every device values of the sampling time, sampling frequency, and times and constants to be used for various discriminations.

In this embodiment, the light quantity peak detection is executed only at the light quantity adjusting time because this system is a high-speed system. However, in a system having a great time margin, the lighting control of the present method may be performed immediately before every read (gain adjustment) operation. By doing so, a lighting control with higher accuracy is achieved, thereby allowing a device of a higher image quality to be provided.

Generally, the warm-up time on the printer section 2 side is longer than the warm-up time (first light quantity adjustment time) of the image reading section IR. Therefore, in this embodiment, the peak detection wait time is a fixed time. However, because the lamp startup (i.e., light quantity rise) characteristic varies depending on the lighting control value at the time of turning on the lamp (it is also influenced by the ambient temperature), it may be acceptable to vary the peak detection wait time according to the lighting control value, thereby making a read start as early as possible.

It is acceptable to make a trouble display on the display panel upon detecting the fact that the fluorescent lamp 215 is saturated or unlit using the sampled light quantity data in the data sampling process of the above item 2. A trouble detecting formula in this case is expressed below.

Light quantity data<{(CCD saturation voltage×analog gain value)/ (quantization voltage range)}×255

If the light quantity data does not satisfy this trouble detecting formula, it is determined that a trouble has occurred due to the saturation.

When it is determined that the light quantity data is saturated, (i) the lighting control value is reduced by one step and without storing this reduced lighting control value in the memory the data sampling process is executed again from the beginning. This operation prevents the setting of an erroneous lighting control value due to disabled lighting control. Also, when it is determined that the saturation is occurring, (ii) if the lighting control value is at the lower limit, it is determined that the saturation trouble has been caused by abnormal lighting of the fluorescent lamp. Further, if the sampling data is kept at an unlit level (minimum) for a specified period, it is determined that the lamp disconnection trouble is occurring.

If the light quantity variation curve determining process of the above item 5. does not end even when a time longer than a maximum warm-up time (five minutes, for example) of the printer section 2 of the copying machine has elapsed, it is possible to determine the phenomenon as a time-out trouble and display the same on the display panel or the like.

Next, the second light quantity adjustment and gain adjustment of this embodiment will be described.

Figure 31:
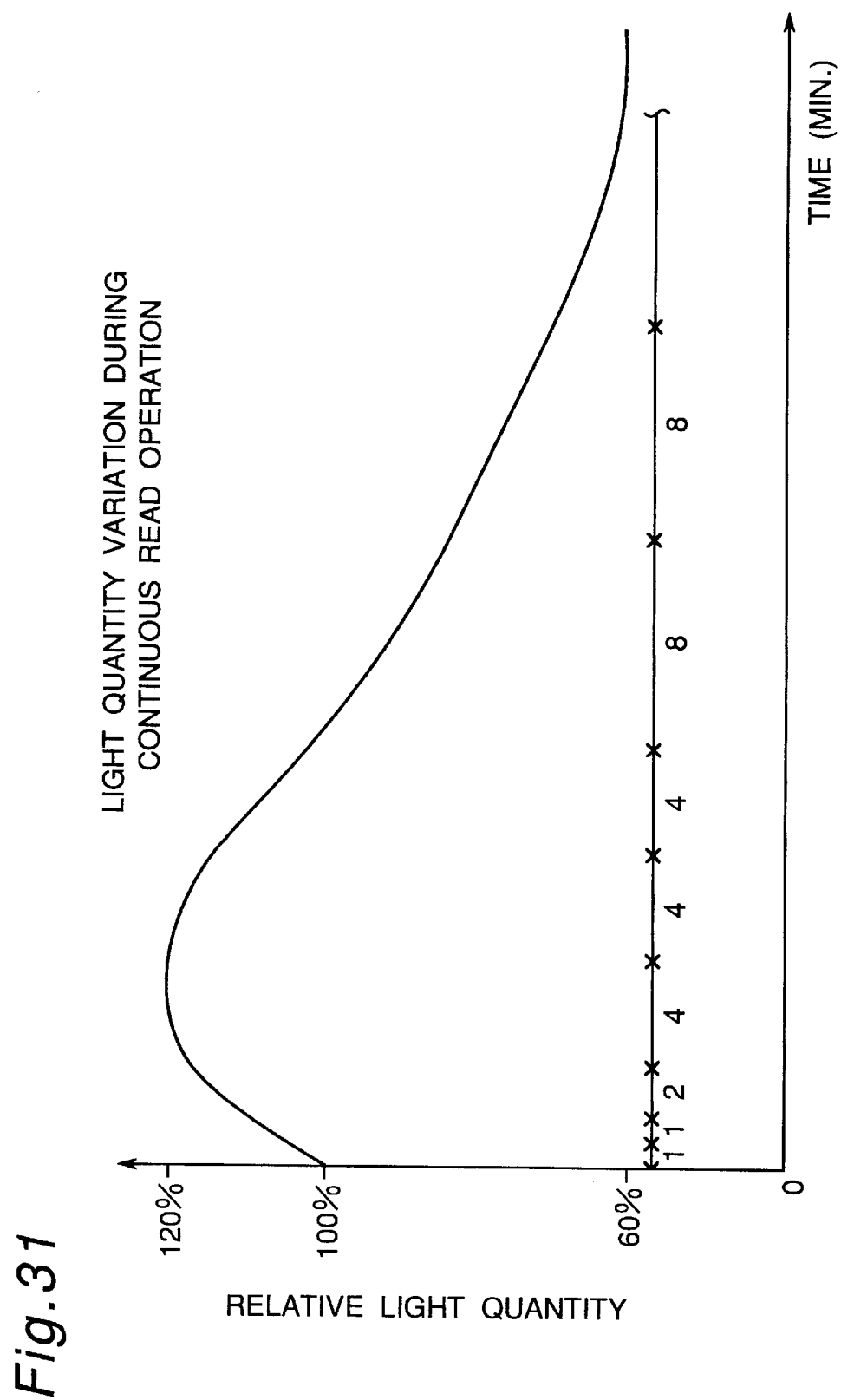
FIG. 31 shows a characteristic of the above fluorescent lamp when the lamp operates continuously.

As shown in FIG. 31, it is known that if the fluorescent lamp 215 is kept lit for a long time, the light quantity of the lamp fluctuates from about +20% to −40% with respect to the light quantity immediately after the lamp is turned on, due to an increase in tube wall temperature (ambient temperature). The fluctuation value varies depending on the system construction, the control temperature, and so on. In particular, at a low temperature, the light quantity variation per unit time is wide at the startup time of the light quantity, and the decrease in light quantity after the peak is small. At a high temperature, there is a tendency that the light quantity rise is small after the lamp is turned on, however, a light quantity variation per unit time at the light quantity fall time after the peak (an absolute decreased light quantity) is wide.

Then, it is difficult to correctly know the tube wall temperature (ambient temperature) at the time of reading the document. Therefore, the light quantity is corrected so that the light quantity variation during the document read falls within the image quality guarantee tolerance, based on a light quantity variation curve having a maximum light quantity variation shown in FIG. 31. This light quantity correction includes a lighting control for controlling output of the lighting control inverter 216 and a gain adjustment for adjusting a magnification of the amplifier.

Figure 32:
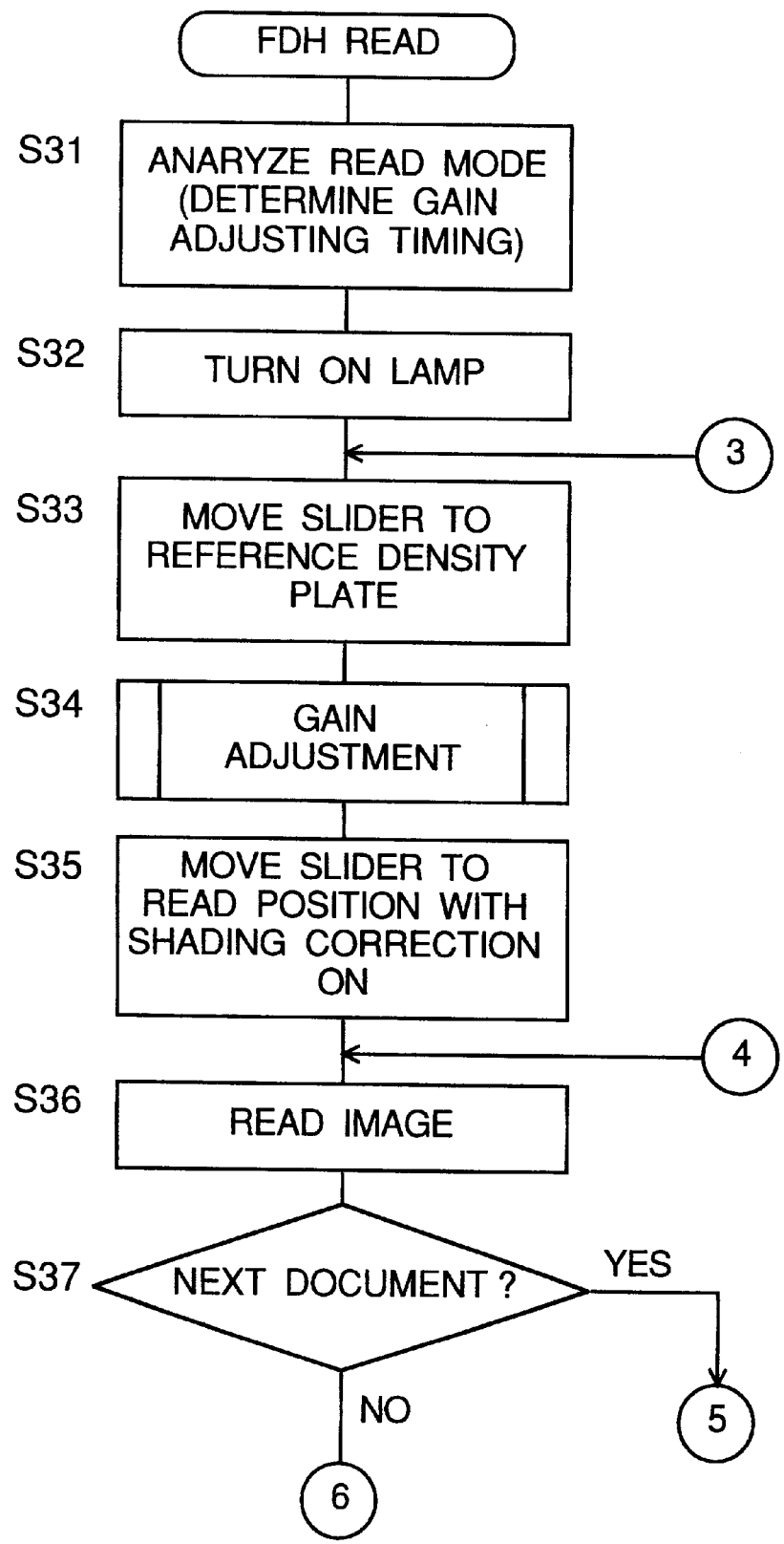
FIGS. 32 and 33 are flowcharts for explaining light quantity correction performed during a continuous document read operation in the third embodiment.
Figure 33:
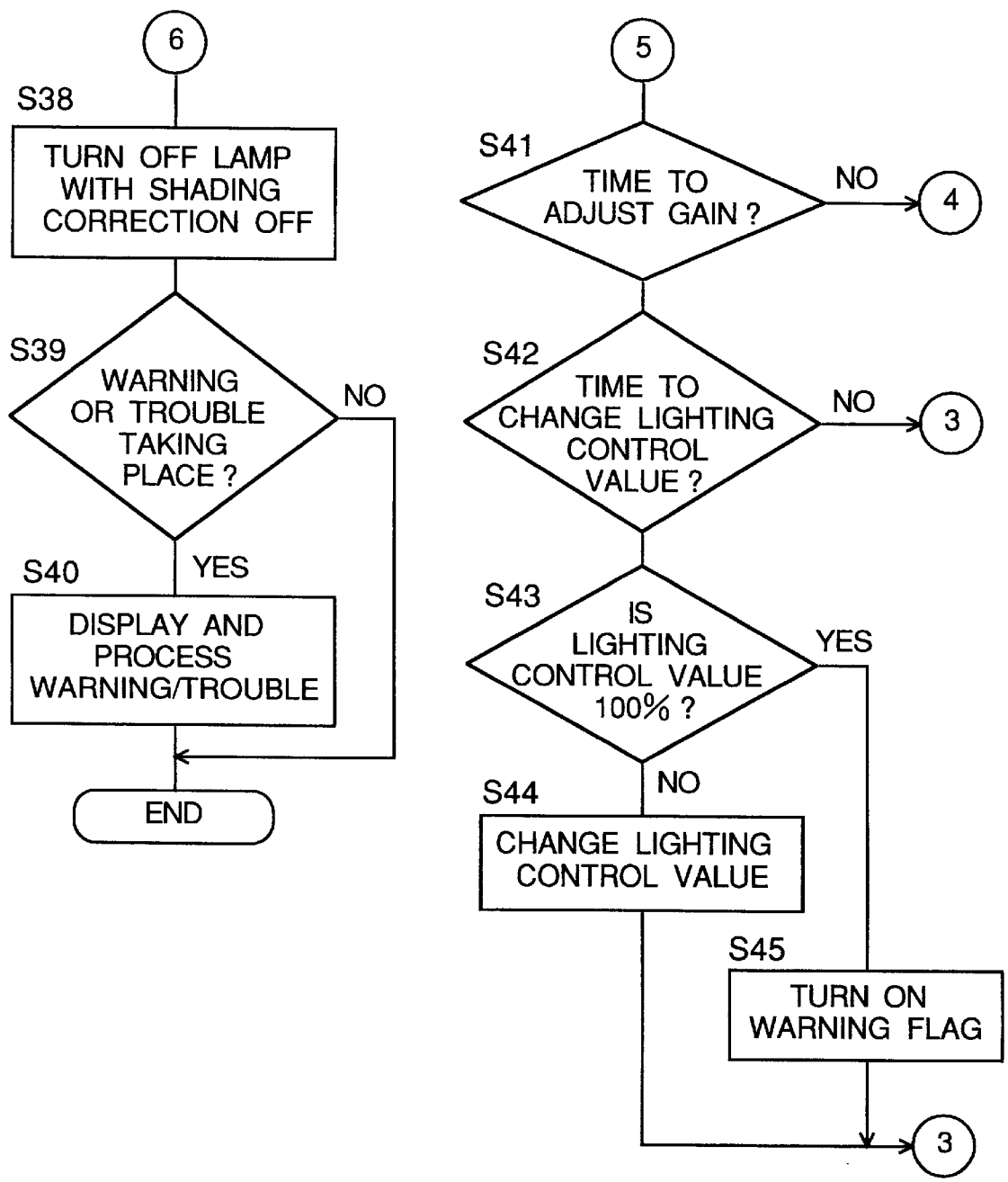
Figure 34:
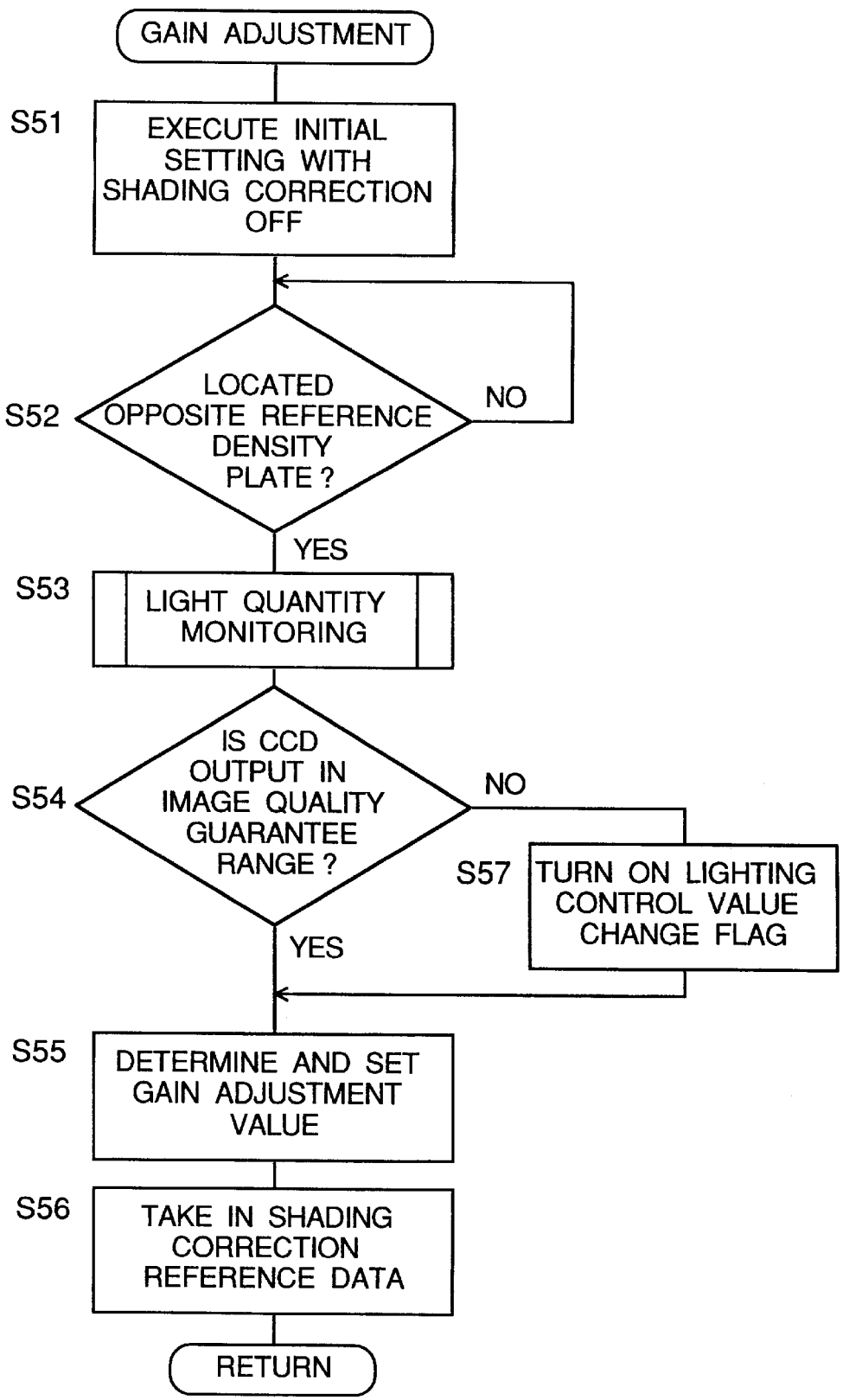
FIG. 34 is a flowchart for explaining a light quantity correcting (gain adjusting) operation in the third embodiment.

The operations of the second light quantity adjustment and the gain adjustment of this embodiment will be described below with reference to the flowcharts shown in FIG. 32 and FIG. 33 and the flowchart shown in FIG. 34.

First, the CPU 28 determines a gain adjustment execution timing according to the light quantity variation with time characteristic curve (FIG. 31) preparatorily stored in the memory 46 (step S31), based on information on the document size, reading mode and so on set from the operation panel OP or the like. The CPU 28 determines the gain adjustment execution timing so that it comes immediately before a document read time if it is predicted that the light quantity variation occurring from the preceding gain adjustment will not be able to be tolerated at the document read time in view of the aforementioned light quantity variation with time characteristic.

Next, the fluorescent lamp 215 is turned on (step S32), and before the first page of the document 202 is read (step S33), the slider 20 shown in FIG. 1 is moved to the position opposite to the reference density plate 41 and the read data of one line in the main scanning direction of the reference density plate 41 is stored in the image monitor section 213 shown in FIG. 2. Then, the CPU 28 obtains a maximum value (monitored light quantity value) of the read data and executes the light quantity correction (gain adjustment) so that an optimum read can be achieved (step S34).

Then, after an optimum quantization dynamic range is set by this gain adjustment, shading correction data for light distribution correction is taken in, and the image read is started in the read position of the automatic document feeder FDH (steps S35 and S36).

Next, the program flow proceeds to step S37 to discriminate whether or not a next document sheet exists. If it is determined that a next document sheet exists, the program flow proceeds to step S41. If it is determined that a next document sheet does not exist, the program flow proceeds to step S38. In this step S38, the fluorescent lamp 215 is turned off and the shading correction ends. Then, the program flow proceeds to step S39 to discriminate whether or not a warning or trouble has occurred. If it is determined that neither warning nor trouble is occurring, the processing ends. If it is determined that a warning or trouble is occurring, the program flow proceeds to step S40 to display a warning or trouble message and execute a necessary processing to deal with it.

In step S41, if it is determined that now is the time to adjust the gain as set in step S31, the program flow proceeds to step S42 to discriminated whether or not now is time to change the lighting control value, i.e., whether or not a lighting control value change flag has been turned on. If it is determined in step S41 that now is not the time to adjust the gain, the program flow returns to step S36 to execute the image read. The lighting control value change flag is to be turned on in step S57 of FIG. 34.

If it is determined in step S42 that now is not the time to change the lighting control value, the program flow returns to step S33 to move the slider 20 from the read position 4 of the automatic document feeder FDH to the position opposite to the reference density plate 41, and the program flow proceeds to step S34 to execute the light quantity correction and light distribution correction in that opposite position. In the light quantity correction process, the gain adjustment for increasing or decreasing the gain according to the excess or shortage of the gain is executed, and the shading correction data is taken in in the light distribution correction process. Subsequently, the slider 20 is moved back to the position 4 for the continuous document read.

If it is determined in step 542 that the lighting control value change flag is on, the program flow proceeds to step S43 to discriminate whether or not the current lighting control value is 100%. If it is determined that the lighting control value is 100%, the program flow proceeds to step S45 to turn on a warning flag. If it is determined in step S43 that the current lighting control value is not 100%, the program flow proceeds to step S44 to change the lighting control value, and the program flow returns to step S33.

Next, the gain adjustment in step S34 will be described with reference to the flowchart of FIG. 34. First, in step S51, initial setting is executed and the shading correction is turned off. Then, the program flow proceeds to step S52 to discriminate whether or not the slider 20 is located in the position opposite to the reference density plate 41. If it is determined that the slider is positioned in the opposite position, the program flow proceeds to step S53 to execute a light quantity monitoring. Specifically, the read data of one line in the main scanning direction of the reference density plate 41 is stored in the image monitor section 213, and the monitored light quantity value that is a maximum value of the read data is obtained. Then, the program flow proceeds to step S54 to discriminate whether or not the monitored light quantity value is within the image quality guarantee range. If the monitored light quantity value is out of the image quality guarantee range, the program flow proceeds to step S57. If the monitored light quantity value is in the image quality guarantee range, the program flow proceeds to step S55. In step S57, the lighting control value change flag is set, and a lighting control value (i.e., an output current value of the lighting control inverter 216) is determined so that an optimum light quantity can be obtained in the next gain adjustment stage.

As described above, the image read is started in step S36, and between the completion of output of the document image and the movement of the slider 20 to the position of the reference density plate 41 in step S33 the process flow passes the steps S37, S41, S42, S43 and S44, and in this step S44 the lighting control inverter 216 is set to the lighting control value that has been determined in step S57. Therefore, fluctuation in light quantity during the read process is eliminated, so that the gain adjustment process can be executed in the state in which the light quantity is stabilized. As a result, the image quality deterioration is prevented. Furthermore, since no special time is necessary for only the light quantity correction, the productivity can be improved accordingly.

Next, the program flow proceeds to step S55 to set the gain adjustment value, and thereafter the program flow proceeds to step S56 to take in the shading correction reference data. Thus, the gain adjustment process is completed.

The above has described the fluctuation in light quantity, but the light distribution also fluctuates at a rate lower than the fluctuation in light quantity. Therefore, the intake of the shading correction data may be performed in step S35 so that the light distribution is also corrected simultaneously with correcting the fluctuation in light quantity. With this arrangement, the frequency of the reciprocating movement of the slider 20 between the density plate 41 (shading plate) and the document read position 4 can be reduced. As a result, the read image quality can be improved while suppressing the reduction in productivity to the minimum. In this case, in addition to the light quantity variation curve shown in FIG. 31, a characteristic curve of variation with time of the distribution should be stored in the memory 46. Depending on cases, only the light distribution correction may be performed.

The X-shaped marks on a line extended in parallel with the axis of time in FIG. 31 show an example of the gain adjustment execution timing. Each numerical value indicated below the corresponding line segment between the adjacent X-shaped marks represents the number of document sheets read during the time represented by the length of the line segment between the adjacent X-shaped marks. In this example, the gain adjustment execution timing was determined by limiting a permissible fluctuation in light quantity with regard to the image quality in reading one page of the document to 5% and considering a time required for reading one page and a time required for moving the slider 20 and executing the light quantity correction and light distribution correction. As is obvious from FIG. 31, the gain adjustment frequency is high in the initial stage of the lamp operation, and the light quantity variation becomes gradually smaller as time elapses, with which the gain adjustment frequency is gradually reduced.

Assuming that the distance between the reference density plate 41 and the document read position 4 is 50 mm and the travel speed of the slider 20 is 400 mm/sec, then a time required for the gain adjustment (i.e., the time required for the reciprocating movement of the slider 20) becomes 0.5 seconds or more. Therefore, assuming that the gain adjustment is executed for every page in a high-speed system of 60 ppm (pages per second), then about 30 seconds is required for the correction in copying 60 pages. Therefore, in order to achieve the speed of 60 ppm while executing the gain adjustment during the read operation, it is necessary to achieve an ability corresponding to 90 ppm in a system which does not execute the gain adjustment during the read operation. This fact means that the degree of difficulty in achieving the mechanical reliability and durability increases to a great extent.

In contrast, by setting the gain adjusting timing based on the characteristic curve of variation with time of the light quantity as in the aforementioned embodiment, the frequency of execution of the gain adjustment is reduced to the minimum. Therefore, the copying ability of 60 ppm can be achieved in executing the gain adjustment during the read operation with the mechanical ability of a system which has a copying ability of slightly smaller than 70 ppm without performing the gain adjustment during the read operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image reading device comprising:
   a light source for illuminating a document;
   an image reader for reading the illuminated document and outputting an image signal;
   light quantity detecting means for detecting a light quantity of said light source;
   light quantity correcting means for correcting a fluctuation in light quantity of said light source based on the light quantity detected by said light quantity detecting means;
   counting means for counting a number of document read operations performed by said image reader; and
   light quantity detection timing changing means for changing a timing of light quantity detection by said light quantity detecting means according to the number of document read operations counted by said counting means.

2. An image reading device as claimed in claim 1, wherein said light source comprises a fluorescent lamp.

3. An image reading device as claimed in claim 2, wherein the light quantity of said light source varies according to the illuminating time which has elapsed from start of illumination.

4. An image reading device as claimed in claim 3, wherein said light quantity detection timing changing means makes intervals between light quantity detection operations longer when the number of document read operations is great than when the number of document read operations is small.

5. An image reading device as claimed in claim 2, wherein the light quantity of said light source reduces as a cumulative number of document read operations increases.

6. An image reading device as claimed in claim 1, wherein said light quantity detection timing changing means comprises means for changing the light quantity detecting timing according to the cumulative number of document read operations.

7. An image reading device comprising:
   a light source for illuminating a document;
   an image reader for reading the illuminated document and outputting an image signal;
   light quantity detecting means for detecting a light quantity of said light source;
   light quantity correcting means for correcting a fluctuation in light quantity of said light source based on the light quantity detected by said light quantity detecting means;
   mode setting means for selecting one out of a plurality of modes and setting the selected mode; and
   light quantity detection timing changing means for changing a timing of light quantity detection by said light quantity detecting means according to the mode set by said mode setting means.

8. An image reading device as claimed in claim 7, further comprising:
   a memory for storing therein the image signal,
   wherein said plurality of modes at least include a high image quality mode in which the image signal is output to outside without being stored in said memory and a high production mode in which the image signal is once stored in said memory and then output to the outside, and
   wherein said light quantity detection timing changing means changes the timing of light quantity detection such that intervals between light quantity detection operations are longer in the high production mode than in the high image quality mode.

9. An image reading device comprising:
   a light source for illuminating a document;
   a photoelectric converting section for converting a reflection light from the document into an analog electric signal;
   a signal converting section for converting said analog electric signal into a digital signal;
   light quantity detecting means for detecting a light quantity of said light source;
   light quantity correcting means for correcting a fluctuation in light quantity of said light source based on the light quantity detected by said light quantity detecting means;
   mode setting means for selecting one out of a plurality of modes and setting the selected mode; and
   light quantity detection timing changing means for changing a timing of light quantity detection by said light quantity detecting means according to the mode set by said mode setting means.

10. An image reading device as claimed in claim 9, wherein said light quantity detection timing changing means sets the timing of light quantity detection to a predetermined timing regardless of the set mode in a light quantity rising period in which the light quantity of said light source increases, and said light quantity detection timing changing means changes the timing of light quantity detection according to the set mode in a light quantity stabilized period coming after the light quantity rising period.

11. An image reading device as claimed in claim 9, further comprising a memory for storing therein the digital signal,
    wherein said plurality of modes at least include a high image quality mode in which the digital signal is directly output to outside without being stored in said memory and a high production mode in which the digital signal is once stored in said memory and then output to the outside, and
    wherein said light quantity detection timing changing means sets a number of light quantity detection operations per a specified time to be greater when the high image quality mode is set than when the high production mode is set.

12. An image reading device as claimed in claim 9, further comprising a memory for storing therein the digital signal,
    wherein said plurality of modes at least include a high image quality mode in which the digital signal is directly output to outside without being stored in said memory and a high production mode in which the digital signal is once stored in said memory and then output to the outside, and
    wherein when the high production mode has been set, said light quantity detection timing changing means sets a timing of light quantity correction to be performed in a period until a next light quantity detection is performed, based on a light quantity transition curve predicted from the light quantity already detected by the light quantity detecting means.

13. An image reading device as claimed in claim 9, wherein when a double-sided document reading mode has been set, said light quantity detecting means executes light quantity detection in a period in which a document sheet is inverted.

14. An image reading device as claimed in claim 9, wherein the light quantity detection timing changing means sets the timing of light quantity detection based on a document size and a number of document sheets which have been read.

15. An image reading device as claimed in claim 9, further comprising a shading correcting section for correcting a light distribution nonuniformity of said illuminating means and a variation in sensitivity of pixels included in said photoelectric converting section.

16. An image reading method comprising the steps of:
  illuminating a document;
  reading the illuminated document and outputting an image signal;
  detecting a quantity of light illuminating the document with a specified timing;
  correcting a fluctuation in light illuminating the document based on the detected light quantity;
  counting a number of document read operations;
  changing the timing of light quantity detection according to the counted number of document read operations.

17. An image reading method comprising:
  illuminating a document;
  reading the illuminated document and outputting an image signal;
  detecting a quantity of light illuminating the document with a specified timing;
  correcting a fluctuation in light illuminating the document based on the detected light quantity;
  selecting one out of a plurality of modes to set the selected mode; and
  changing the timing of light quantity detection according to the set mode.

18. An image reading method comprising the steps of:
  illuminating a document;
  converting a reflection light from the document into an analog electric signal;
  converting said analog electric signal into a digital signal;
  detecting a quantity of light illuminating the document with a specified timing;
  correcting a fluctuation in light illuminating the document based on the detected light quantity;
  selecting one out of a plurality of modes to set the selected mode; and
  changing the timing of light quantity detection according to the set mode.

19. An image reading device comprising:
  a light source for illuminating an object;
  light quantity detecting means for detecting a light quantity of said light source;
  light quantity correcting means for correcting a fluctuation in light quantity of said light source based on the light quantity detected by said light quantity detecting means;
  light quantity variation characteristic detecting means for detecting a variation characteristic of the light quantity from a time at which said light source is turned on;
  light quantity detection timing changing means for changing a timing of light quantity detection by said light quantity detecting means according to the detected light quantity variation characteristic; and
  an image sensor for reading the illuminated object and outputting an image signal.

20. An image reading device as claimed in claim 19, wherein said light source comprises a fluorescent lamp.

21. An image reading device as claimed in claim 20, wherein said light quantity variation characteristic varies according to a state before said light source is turned on.

22. An image reading device as claimed in claim 21, wherein said light quantity variation characteristic varies according to a tube wall temperature of said light source before this light source is turned on.

23. An image reading device as claimed in claim 22, wherein the light quantity variation characteristic detecting means comprises:
  means for detecting the tube wall temperature; and
  means for determining the light quantity variation characteristic of said light source based on the tube wall temperature detected by said detecting means.

24. An image reading device as claimed in claim 20, wherein said light quantity variation characteristic is of a light quantity variation from a time immediately after said light source is turned on.

25. An image reading device as claimed in claim 19, wherein said light quantity detection timing changing means comprises means for detecting a peak of light quantity after said light source is turned on, and changes the light quantity detecting timing after the peak is detected.

26. An image reading device comprising:
  a light source for illuminating an object;
  light quantity detecting means for detecting a light quantity of said light source;
  light quantity correcting means for correcting a fluctuation in light quantity of said light source based on the light quantity detected by said light quantity detecting means;
  light quantity detection timing changing means for changing a timing of light quantity detection by said light quantity detecting means according to a duration of an illuminating time of the light source; and
  an image sensor for reading the illuminated object and outputting an image signal.

27. An image reading device as claimed in claim 26, wherein said light source comprises a fluorescent lamp.

28. An image reading device as claimed in claim 27, wherein the light quantity of said light source varies according to the illuminating time which has elapsed from start of illumination.

29. An image reading device as claimed in claim 28, further comprising:
  timer means for measuring time elapsing from a time immediately after said light source is turned on,
  wherein said light quantity detection timing changing means makes intervals between light quantity detection operations longer after the time measured by said timer has reached a specified time than before the time measured by said timer reaches the specified time.

30. An image reading device as claimed in claim 27, wherein the light quantity of said light source reduces as a cumulative illumination time increases.

31. An image reading device as claimed in claim 26, wherein said light quantity detection timing changing means changes the light quantity detecting timing according to the cumulative illumination time of said light source.

32. An image reading device comprising:
  a light source for illuminating a document;

light quantity detecting means for detecting a light quantity of said light source;

light quantity correcting means for predicting a fluctuation in light quantity based on a history of the light quantity detected by said light quantity detecting means, and correcting the light quantity of said light source to the predicted light quantity; and an image sensor for reading the illuminated object and outputting an image signal.

33. An image reading method comprising the steps of:

illuminating an object;

detecting a quantity of light illuminating the object with a specified timing;

correcting a fluctuation in light illuminating the object based on the detected light quantity;

detecting a light quantity variation characteristic from a time at which illumination is started;

changing the timing of light quantity detection according to the detected light quantity variation characteristic; and reading the illuminated object and outputting an image signal.

34. An image reading method comprising the steps of:

illuminating an object;

detecting a quantity of light illuminating the object with a specified timing;

correcting a fluctuation in light illuminating the object based on the detected light quantity;

changing the timing of light quantity detection according to a duration of illumination; and reading the illuminated object and outputting an image signal.

35. An image reading method comprising the steps of:

illuminating an object;

detecting a quantity of light illuminating the object with a specified timing;

predicting a fluctuation in light quantity based on a history of the detected light quantity;

correcting the light quantity to the predicted light quantity; and reading the illuminated object and outputting an image signal.

* * * * *